United States Patent
Nakamura

(10) Patent No.: US 10,044,930 B2
(45) Date of Patent: Aug. 7, 2018

(54) PHOTOGRAPHING ASSISTING SYSTEM, PHOTOGRAPHING APPARATUS, INFORMATION PROCESSING APPARATUS AND PHOTOGRAPHING ASSISTING METHOD

(71) Applicant: FUJITSU LIMITED, Kawasaki-shi (JP)

(72) Inventor: Yasufumi Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 15/279,286

(22) Filed: Sep. 28, 2016

(65) Prior Publication Data

US 2017/0019591 A1    Jan. 19, 2017

Related U.S. Application Data

(63) Continuation of application No. PCT/JP2014/059330, filed on Mar. 28, 2014.

(51) Int. Cl.
H04N 5/232    (2006.01)
H04N 5/247    (2006.01)

(52) U.S. Cl.
CPC ..... *H04N 5/23222* (2013.01); *H04N 5/23206* (2013.01); *H04N 5/23219* (2013.01); *H04N 5/23293* (2013.01); *H04N 5/247* (2013.01)

(58) Field of Classification Search
CPC .... G06Q 50/01; H04L 63/10; H04N 5/23206; H04N 5/23222; H04N 1/00183; H04N 1/00307; H04N 5/232
See application file for complete search history.

(56) References Cited

U.S. PATENT DOCUMENTS 8,094,963 B2 * 1/2012 Funayama ............ G03B 42/04
382/100
2004/0150724 A1    8/2004 Nozaki et al.
(Continued)

FOREIGN PATENT DOCUMENTS

JP    2004-235783    8/2004
JP    2007-020104    1/2007
(Continued)

OTHER PUBLICATIONS

International Search Report for PCT/JP2014/059330 dated Jun. 17, 2014.
(Continued)

*Primary Examiner* — Trung Diep
(74) *Attorney, Agent, or Firm* — Maschoff Brennan

(57) ABSTRACT

It is provided a photographing assisting system. The system includes a plurality of photographing apparatuses and an information processing apparatus which receives images from the plurality of photographing apparatuses, recognizes a subject in each received image and a location in which each received image is photographed, determines a group including at least one photographing apparatus within a predetermined area of each photographing apparatus and detects a photographing situation indicating the subject, the location and a photographer of the photographing apparatus within the predetermined area. The information processing apparatus outputs photographing advice according to the photographing situation of each of the plurality of photographing apparatuses to the photographing apparatus in the group. The photographing apparatus in the group outputs the photographing advice received from the information processing apparatus.

7 Claims, 24 Drawing Sheets

(56) References Cited

U.S. PATENT DOCUMENTS

| | | | |
|---|---|---|---|
| 2004/0174434 A1* | 9/2004 | Walker | G06F 17/30265 |
| | | | 348/211.3 |
| 2007/0019083 A1 | 1/2007 | Nakashima | |
| 2011/0187914 A1* | 8/2011 | Lee | H04N 5/222 |
| | | | 348/333.11 |
| 2012/0013782 A1 | 1/2012 | Mori | |

FOREIGN PATENT DOCUMENTS

| | | |
|---|---|---|
| JP | 2011-211391 | 10/2011 |
| JP | 2012-023501 | 2/2012 |
| JP | 2012-50011 | 3/2012 |
| JP | 2012-094979 | 5/2012 |

OTHER PUBLICATIONS

Written Opinion of the International Search Authority (Form PCT/ISA/237 of PCT/JP2014/059330) dated Jun. 17, 2014. Partial translation: p. 3.

The Office Action dated Nov. 7, 2017 issued in the corresponding Japanese application No. 2016-509860 Machine Translation.

* cited by examiner

FIG. 4A

| FILE INDEX | FILE NAME | STORAGE DESTINATION | IMAGE TYPE | PHOTOGRAPHING DATE | PHOTOGRAPHING LOCATION | PHOTOGRAPHER ID |
|---|---|---|---|---|---|---|
| 1 | Photo000.jpg | C:¥20100331 | P | 2010/3/31 10:00:24 | N 43' 34<br>E 133 | 1 |
| 2 | Photo001.jpg | C:¥20100331 | P | 2010/3/31 12:10:02 | N 43' 34<br>E 133 | 1 |
| 3 | Photo002.jpg | C:¥20100331 | P | 2010/3/31 15:30:41 | N 43' 34<br>E 133 | 2 |
| ... | ... | | | | | |
| 3001 | Movie001.mpg | C:¥20100331 | M | 2010/3/31 9:55:14 | | 1 |
| 3002 | Movie002.mpg | C:¥20100331 | M | 2010/3/31 11:10:22 | | 1 |
| 3003 | Movie003.mpg | C:¥20100331 | M | 2010/3/31 14:30:01 | | 1 |
| ... | ... | | ... | | | |

FIG. 4B

| SUBJECT ID | SUBJECT NAME |
|---|---|
| 1 | ADMINISTRATOR |
| 2 | WIFE |
| 3 | TARO |
| 4 | HANAKO |
| 11 | MALE FRIEND A |
| 12 | MALE FRIEND B |
| 13 | FEMALE FRIEND C |
| ... | |

| INDEX | IMAGE ID | SUBJECT ID | SUBJECT AREA | PROCESS COMPLETED |
|---|---|---|---|---|
| ... | ... | ... | ... | ...... |
| 223 | 1201 | 1 | (13, 0) – (157, 220) | |
| 224 | 1201 | 2 | (311, 38) – (458, 232) | |
| 225 | 1201 | 4 | (181, 12) – (289, 159) | |
| ... | ... | ... | ... | ...... |

FIG. 4E

| SUBJECT ID | SUBJECT NAME | SUBJECT FREQUENCY | SUBJECT POINT |
|---|---|---|---|
| 1 | ADMINISTRATOR | 2 | 2 |
| 2 | WIFE | 5 | 15 |
| 3 | TARO | 30 | 90 |
| 4 | HANAKO | 22 | 22 |
| 3, 4 | TARO & HANAKO | 5 | 15 |
| 1, 3, 4 | ADMINISTRATOR, TARO & HANAKO | 4 | 4 |
| 2, 3, 4 | WIFE, TARO & HANAKO | 2 | 6 |
| 1, 2, 3, 4 | ADMINISTRATOR, WIFE, TARO & HANAKO | 2 | 4 |
| 11 | MALE FRIEND A | 8 | 24 |
| 12 | MALE FRIEND B | 7 | 14 |
| 13 | FEMALE FRIEND C | 2 | 6 |

FIG. 4F

| PHOTOGRAPHER ID | PHOTOGRAPHER NAME | SKILL LEVEL |
|---|---|---|
| 1 | ADMINISTRATOR | A |
| 2 | WIFE | C |
| 11 | MALE FRIEND A | B |
| 12 | MALE FRIEND B | A |
| 13 | FEMALE FRIEND C | C |
| ... | | |

FIG. 5D

| SUBJECT NAME | PHOTOGRAPHER | SKILL LEVEL OF PHOTOGRAPHER | NUMBER OF IMAGES |
|---|---|---|---|
| ADMINISTRATOR | WIFE | C | 2 |
| WIFE | ADMINISTRATOR | A | 5 |
| TARO | ADMINISTRATOR | A | 30 |
| HANAKO | WIFE | C | 22 |
| ADMINISTRATOR & WIFE | — | | 0 |
| ADMINISTRATOR & TARO | — | | 0 |
| ADMINISTRATOR & HANAKO | — | | 0 |
| WIFE & TARO | — | | 0 |
| WIFE & HANAKO | — | | 0 |
| TARO & HANAKO | ADMINISTRATOR | A | 5 |
| ADMINISTRATOR, WIFE & TARO | — | | 0 |
| ADMINISTRATOR, WIFE & HANAKO | — | | 0 |
| ADMINISTRATOR, TARO & HANAKO | WIFE | C | 4 |
| WIFE, TARO & HANAKO | ADMINISTRATOR | A | 2 |
| ADMINISTRATOR, WIFE, TARO & HANAKO | MALE FRIEND A | B | 2 |
| MALE FRIEND A | MALE FRIEND B | A | 8 |
| MALE FRIEND B | MALE FRIEND A | B | 7 |
| FEMALE FRIEND C | MALE FRIEND B | A | 2 |

PHOTOGRAPHING ADVICE PROCESS

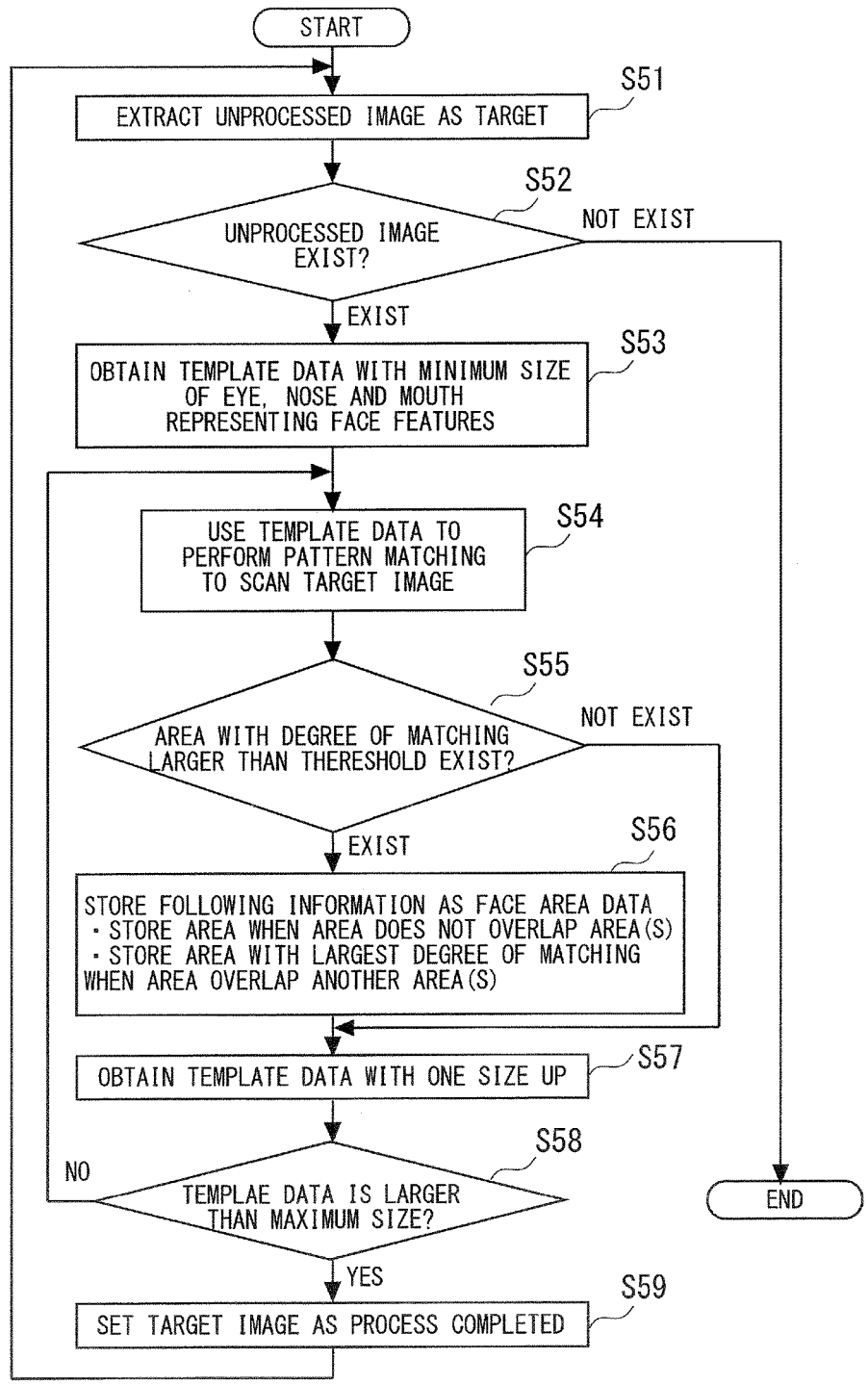

FIG. 6HA

| PHOTOGRAPHER | SUBJECT | PHOTOGRAPHING LOCATION | PROXIMITY TERMINAL INFORMATION |
|---|---|---|---|
| ID=1 | NONE | N. LATITUDE x1<br>E. LONGITUDE y1<br>DIRECTION z1 | ID=13 |

FIG. 6HB

| PHOTOGRAPHER | SUBJECT | PHOTOGRAPHING LOCATION | PROXIMITY TERMINAL INFORMATION |
|---|---|---|---|
| ID=13 | NONE | N. LATITUDE x2<br>E. LONGITUDE y2<br>DIRECTION z2 | ID=1 |

FIG. 61A

| LIST ID | PHTOGRAPHER | PHOTOGRAPHER CHANGE FLAG | SUBJECT | SUBJECT CHANGE FLAG | PHOTOGRAPHING LOCATION | PHOTOGRAPHING LOCATION CHANGE FLAG | POINT |
|---|---|---|---|---|---|---|---|
| 1 | ID=1 | 0 | NONE | 0 | N.LATITUDE  $x1$<br>E.LONGITUDE $y1$<br>DIRECTION  $z1$ | 0 | 0 |
| 2 | ID=1 | 0 | ID=13 | 2 | N.LATITUDE  $x1$<br>E.LONGITUDE $y1$<br>DIRECTION  $z1$ | 0 | 0 |
| 3 | ID=13 | 1 | ID=1 | 2 | N.LATITUDE  $x1$<br>E.LONGITUDE $y1$<br>DIRECTION  $z1$ | 0 | 0 |

FIG. 61B

| LIST ID | PHTOGRAPHER | PHOTOGRAPHER CHANGE FLAG | SUBJECT | SUBJECT CHANGE FLAG | PHOTOGRAPHING LOCATION | PHOTOGRAPHING LOCATION CHANGE FLAG | POINT |
|---|---|---|---|---|---|---|---|
| 1 | ID=13 | 0 | NONE | 0 | N.LATITUDE  $x2$<br>E.LONGITUDE $y2$<br>DIRECTION  $z2$ | 0 | 0 |
| 2 | ID=13 | 0 | ID=1 | 2 | N.LATITUDE  $x2$<br>E.LONGITUDE $y2$<br>DIRECTION  $z2$ | 0 | 2 |
| 3 | ID=1 | 1 | ID=13 | 2 | N.LATITUDE  $x2$<br>E.LONGITUDE $y2$<br>DIRECTION  $z2$ | 0 | 8 |

FIG. 6K

| SETTING ITEM | PRESET VALUE | CURRENT VALUE |
|---|---|---|
| NUMBER OF PIECES OF ADVICE TO BE DISPLAYED | 1 | 1 |

FIG. 6LA

| LIST ID | PHTOGRAPHER | PHOTOGRAPHER CHANGE FLAG | SUBJECT | SUBJECT CHANGE FLAG | PHOTOGRAPHING LOCATION | PHOTOGRAPHING LOCATION CHANGE FLAG | POINT |
|---|---|---|---|---|---|---|---|
| 2 | ID=1 | 0 | ID=13 | 2 | N.LATITUDE x1<br>E.LONGITUDE y1<br>DIRECTION z1 | 0 | 6 |

FIG. 6LB

| LIST ID | PHTOGRAPHER | PHOTOGRAPHER CHANGE FLAG | SUBJECT | SUBJECT CHANGE FLAG | PHOTOGRAPHING LOCATION | PHOTOGRAPHING LOCATION CHANGE FLAG | POINT |
|---|---|---|---|---|---|---|---|
| 3 | ID=1 | 1 | ID=13 | 2 | N.LATITUDE x2<br>E.LONGITUDE y2<br>DIRECTION z2 | 0 | 8 |

FIG. 6M

| ADVICE ID | CHANGE DETAILS | ADVICE CHARACTER STRINGS |
|---|---|---|
| 1 | PHOTOGRAPHER | <PHOTOGRAPHER ID> IS AROUND.<br>WHY DON'T YOU ASK HIM/HER TO PHOTOGRAPH AN IMAGE? |
| 10 | SUBJECT (1) | <SUBJECT ID> IS AROUND.<br>WHY DON'T YOU PHOTOGRAPH YOU TOGETHER? |
| 11 | SUBJECT (2) | <SUBJECT ID> IS AROUND.<br>WHY DON'T YOU OFFER TO PHOTOGRAPH HIM/HER? |
| 100 | PHOTOGRAPHER & SUBJECT (1) | <PHOTOGRAPHER ID> IS AROUND.<br>WHY DON'T YOU JOIN THE GROUP? |
| 101 | PHOTOGRAPHER & SUBJECT (2) | <PHOTOGRAPHER ID> IS AROUND.<br>WHY DON'T YOU ASK HIM/HER TO PHOTOGRAPH YOU? |

FIG. 6N

| SETTING VALUE | FILE NAME | DESCRPTIONS OF DISPLAY METHOD (NOT INCLUDED IN ACTUAL DATA) |
|---|---|---|
| 1 (PRESET VALUE) | Advice1.xml | · DISPLAY PLURALITY PIECES OF ADVICE CONCURRENTLY<br>· NO SOUND EFFECTS |
| 2 | Advice2.xml | · DISPLAY ADVICE SEQUENTIALLY IN DISPLAY AREA<br>· NO SOUND EFFECTS |
| 3 | Advice3xml | · DISPLAY ADVICE SEQUENTIALLY IN DISPLAY AREA<br>· NO SOUND EFFECTS |
| ... | | |

PHOTOGRAPHING ASSISTING SYSTEM, PHOTOGRAPHING APPARATUS, INFORMATION PROCESSING APPARATUS AND PHOTOGRAPHING ASSISTING METHOD

CROSS-REFERENCE TO RELATED APPLICATION

This application is a continuation application of International Application PCT/JP2014/059330 filed on Mar. 28, 2014 and designated the U.S., the entire contents of which are incorporated herein by reference.

FIELD

The embodiments discussed herein are related to a photographing assisting system, a photographing apparatus, an information processing apparatus and a photographing assisting method.

BACKGROUND

As Information and Communication Technology (ICT) has been developed and photographing apparatuses such as digital cameras and video cameras have become popular, opportunities for people to view photographed images and videos have increased. In addition, it becomes common that information processing apparatuses such as mobile phones, smartphones, personal computers (PCs), tablet PCs and personal data assistances (PDAs) have a photographing function. Therefore, users of the information processing apparatuses have increasing opportunities to record events in daily lives as photos.

For example, in events such as trips and athletic festivals which many users participate, the users photograph the participants as subjects and the users print the photographed images and videos for the other users and copy the photographed images and videos to storage media.

For example, in events on school calendar such as athletic festivals, teachers and photographers photograph students' active school lives and thereafter sell the photographed images in remembrance of the school lives and use the photographed images for the students' albums. Further, it becomes popular to hold parties for the participants of the events and to use Social Networking Service (SNS) and emails in order to view the photographed images and videos.

The following patent document describes conventional techniques related to the techniques described herein.

PATENT DOCUMENT

[Patent document 1] Japanese Laid-Open Patent Publication No. 2007-020104
[Patent document 2] Japanese Laid-Open Patent Publication No. 2012-023501
[Patent document 3] Japanese Laid-Open Patent Publication No. 2004-235783

SUMMARY

According to one embodiment, it is provided a photographing assisting system. The system includes a plurality of photographing apparatuses and an information processing apparatus which receives images from the plurality of photographing apparatuses, recognizes a subject in each received image and a location in which each received image is photographed, determines a group including at least one photographing apparatus within a predetermined area of each photographing apparatus and detects a photographing situation indicating the subject, the location and a photographer of the photographing apparatus within the predetermined area.

The information processing apparatus outputs photographing advice according to the photographing situation of each of the plurality of photographing apparatuses to the photographing apparatus in the group. The photographing apparatus in the group outputs the photographing advice received from the information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4A is a diagram illustrating an example of a image database;

FIG. 4B is a diagram illustrating an example of a subject database;

FIG. 4E is a diagram illustrating an example of a subject accumulated information table;

FIG. 4F is a diagram illustrating an example of a photographer information database;

FIG. 5D is a diagram illustrating an example of a photographing situation on which a subject is photographed;

FIG. 6C is a diagram illustrating an example of a flowchart of a face detection process in S41 in FIG. 6B;

FIGS. 6HA and 6HB are diagrams illustrating examples of photographing situation information lists;

FIGS. 6IA and 6IB are diagrams illustrating examples of change possibility lists;

FIG. 6K is a diagram illustrating an example of a table for setting the number of advice to be displayed;

FIG. 6L is a diagram illustrating an example of records extracted from the change possibility list in S91 in FIG. 6J;

FIG. 6M is a diagram illustrating an example of a photographing advice database;

FIG. 6N is a diagram illustrating an example of a table for setting a advice display method.

DESCRIPTION OF EMBODIMENTS

Among participants of an event, the frequency of cases in which a subject comes out in photographed images such as pictures and videos depends on the participants. For example, the participants tend to photograph main participants of the event. Therefore, the frequency of cases in which the main participants come out in the images photographed by the other participants becomes high. In another example, some students who do not achieve remarkable results in a school athletic festival may not come out in images photographed in the festival. Therefore, the number of appearances of users in images photographed in events in which many users participate vary from user to user. Further, as a measure taken to balance the opportunities for the participants to be photographed in an event, the participants can be advised in each photographing opportunity. However, each participant's state of mind as a photographer or as a subject should be considered. For example, when a participant does not have many opportunities and the other participants are advised to photograph images in which the participant appears, the opportunity for the participant to be photographed can be increased. However, the participant is often not near the photographing location. In addition, even when the participant is near the photographing location, the participant is often outside the photographing ranges of the images. Furthermore, it can be assumed that the participant is not inclined to be photographed in the first place. A photographing assisting system according to an embodiment is described below with reference to the drawings. Configurations of the following embodiment are exemplifications, and the present apparatus is not limited to the configurations of the embodiment. The photographing assisting system is described with reference to FIGS. 1 to 7.

Embodiment Example (System Configuration)

Figure 1:
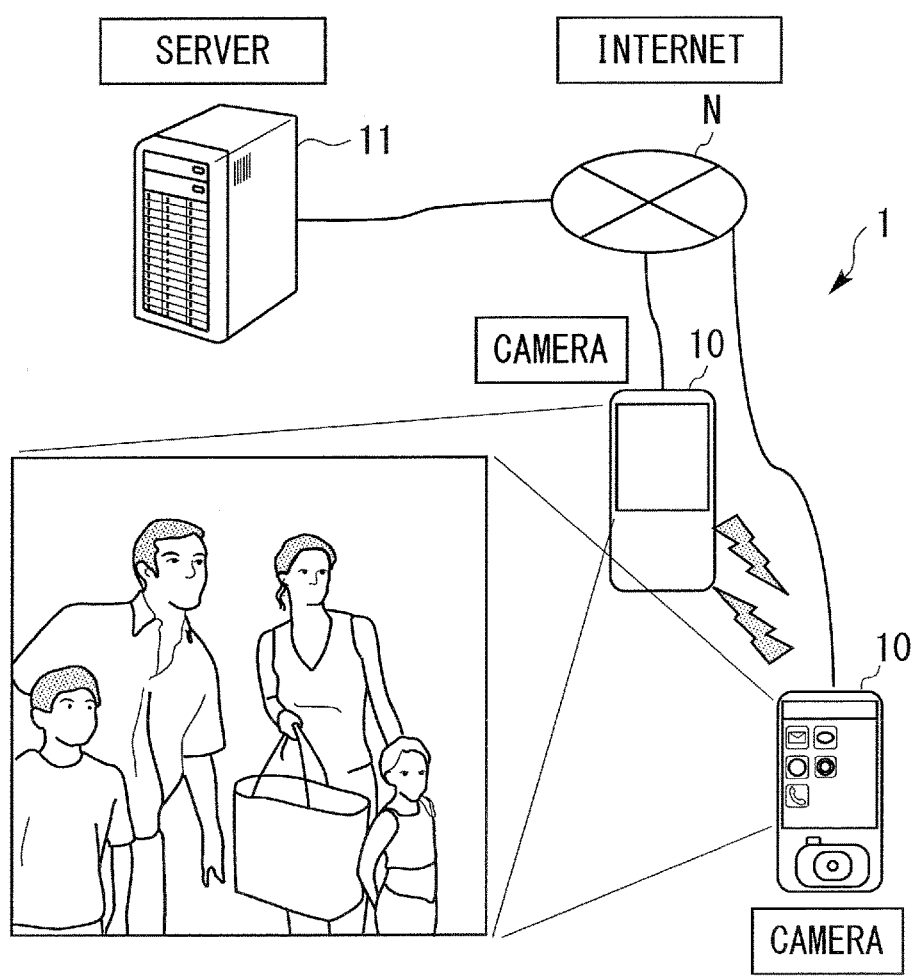
FIG. 1 is a diagram illustrating a photographing assisting system according to an embodiment.

FIG. 1 is a diagram illustrating an example of the photographing assisting system 1 according to the present embodiment. The photographing assisting system 1 in FIG. 1 includes an information processing apparatus 11 and a photographing apparatus 10 which are connected with each other via a network N. The network N includes a public network such as the Internet and a wireless network such as a mobile telephone network. A plurality of photographing apparatuses 10 can be connected with the network N. The photographing apparatus 10 is, for example, a digital camera and a video camera which employ a communication function to connect with the network N. The photographing apparatus 10 includes a portable information processing apparatus with a photographing function such as a mobile phone, a smartphone, a tablet personal computer (PC) and a Personal Data Assistance (PDA).

The information processing apparatus 11 is a computer such as a server and a PC. The information processing apparatus includes a storage device which includes a storage medium to store a variety of programs and data. The storage device is referred to as an external storage device. The storage device includes a solid state drive and a hard disk drive. The storage device can includes a portable storage device such as a Compact Disc (CD) drive, a Digital Versatile Disc drive and a Blu-ray (registered trademark) Disc drive. It is noted that the information processing apparatus 11 and the storage device can be configured as a part of a cloud including a group of computers on a network.

The photographing assisting system 1 in FIG. 1 recognizes a subject in an image and a photographer of the image based on the information of the image which is being photographed in an event by each photographing apparatus 10 connected with the network N, for example. In addition, the photographing assisting system 1 detects a photographing location of each photographing apparatus 10 in the event and detects other photographing apparatuses within a predetermined range of a photographing apparatus 10 which is photographing images. Further, the photographing assisting system 1 determines a photographing situation based on the information of the image which is being photographed by the photographing apparatus 10 and provides an advice to the photographing apparatus 10 which is photographing the image and the other photographing apparatuses within the predetermined range of the photographing apparatus 10 according to the determined photographing situation. The advice is displayed on a display unit such as a monitor of each photographing apparatus, for example.

The user of each photographing apparatus 10 can encourage other users to join as subjects in the image which is being photographed and can ask the other users to photograph the image in place of the user. A photographing advice displayed on the monitor each photographing apparatus 10 can encourage communications among the users to enhance mutual exchanges among the participants of the event in the photographing assisting system 1. In addition, when such mutual exchanges are enhanced, opportunities of photographing images for the participants can be increased to adjust the unevenness of the opportunities.

In the photographing assisting system as illustrated in FIG. 1, the information processing apparatus acquires information of the image which is being photographed by each photographing apparatus 10 connected with the network N. The information processing apparatus 11 recognizes a subject included in an image which is photographed. The information processing apparatus 11 determines whether a subject is included in the image which is photographed. In addition, the information processing apparatus 11 recognizes the photographer of the image which is photographed according to the information for identifying the photographing apparatus 10 and an image of the photographer using the photographing apparatus 10. Further, the information processing apparatus 11 determine photographers using other photographing apparatuses within the predetermined range of the photographing apparatus 10. The information processing apparatus 11 acquires information of the locations of the photographing apparatuses from the photographing apparatuses connected with the network N. The information of the locations of the photographing apparatuses 10 is acquired by a Global Positioning System (GPS) function, for example. The information processing apparatus 11 uses the acquired information of the locations to determine other photographers near the photographing apparatus 10 based on the relative relations between the photographing apparatus 10 and the other photographing apparatuses.

In the photographing assisting system 1 in FIG. 1, the information processing apparatus 11 recognizes the photographing situation of the photographing apparatus 10 based on information including a subject identified in the received image, the presence of a subject, the photographer of the image, another photographer within a predetermined range of the photographing apparatus 10.

Furthermore, in the photographing assisting system 1 in FIG. 1, the information processing apparatus 11 gathers images such as pictures and videos photographed by the users of the photographing apparatuses 10 connected with the network N. The gathered images are stored in the storage device of the information processing apparatus 11. The information processing apparatus 11 determines ranks of the images which are gathered and stored as described above to indicate the skillfulness, which is referred to as skill level, of the photographing technique of each user. In addition, the information processing apparatus 11 calculates, for the composition of each subject, the number of photographed images related to the composition of each subject which is referred to as a frequency of the appearance of the subject and a point based on the frequency of the appearance of the subject and the photographer's skill level which is referred to as a subject point.

The information processing apparatus 11 generates information including a point reflecting the compositions of a subject before and after a photographing situation is changed, a skill level of the photographer and skill levels of other photographers etc., which is referred to as change possibility information. It is noted that the compositions of the subject before and after a photographing situation is changed also indicate the change between a photographing situation including a subject and a photographing situation not including the subject.

The photographing apparatus 10 in the photographing assisting system 1 in FIG. 1 generates advice information for the photographer who is photographing the image based on the point included in the generated change possibility information. The advice information includes advice for encouraging to include a subject in a photographing image and asking another photographer to photographing the image. The photographing apparatus 10 display the generated advice information on the monitor which is displaying the photographing image according to a predetermined method of displaying the advice information. The advice information is displayed to overlap the image on the monitor.

Therefore, the photographer using the photographing apparatus 10 can encourage photographers using other photographing apparatuses within the predetermined range of the photographing apparatus 10 to join in the photographing image as subjects based on the displayed advice information, for example. In addition, the other photographers can ask a photographer to photograph an image on the scene based on the displayed advice information, for example.

Since the photographing assisting system 1 can encourage the mutual communication among the photographers according to the advice regarding photographing displayed on the monitor of the photographing apparatus 10, the mutual exchanges among the participants of the event can be enhanced. As a result, the photographing assisting system 1 provides a technique for providing photographing situations in which photographers photograph images with each other to balance the opportunities for the participants to be photographed in an event.

(Apparatus Configuration)

Figure 2A:
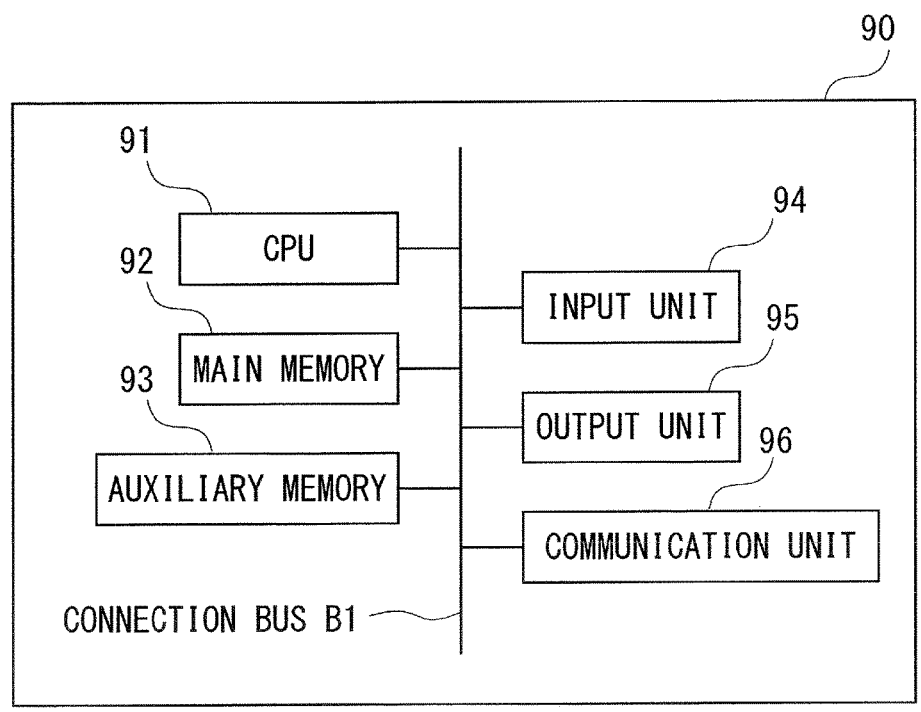
FIG. 2A is a diagram illustrating an example of a hardware configuration of a computer.

FIG. 2A illustrates an example of a hardware configuration of an information processing apparatus 90. The information processing apparatus 90 employs a general computer configuration. The photographing apparatus 10 and the information processing apparatus 11 is manufactured by using the information processing apparatus 90 in FIG. 2A.

The information processing apparatus 90 includes a Central Processing Unit (CPU) 91, main memory 92, auxiliary memory 93, an input unit 94, an output unit 95 and a communication unit 96. The main memory 92 and the auxiliary memory 93 are a computer-readable storage medium.

The CPU 91 deploys programs stored in the auxiliary memory 93 onto a working area on the main memory 92 and the information processing apparatus 90 achieves control of peripheral devices according to the execution of the programs. As a result the information processing apparatus 90 can achieve functions for predetermined purposes in the present embodiment.

The CPU 91 of information processing apparatus 90 in FIG. 2A is a central processing unit for controlling the entire information processing apparatus 90. The CPU 91 performs processes according to the programs stored in the auxiliary memory 93. The main memory 92 is a storage medium used by the CPU 91 for caching the programs and data and reserving the working area. The main memory 92 includes Random Access Memory (RAM) and Read Only Memory.

The auxiliary memory 93 stores the programs and data in a readable manner and a writable manner. The auxiliary memory 93 stores Operating System (OS), programs and tables etc. The OS includes a communication interface program for transmitting data to and receiving data from external apparatuses connected via the communication unit 96. The external apparatus includes an information processing apparatus, an external storage apparatus and an apparatus including a communication function etc. which are connected with the network N.

The auxiliary memory 93 is an Erasable Programmable ROM (EPROM), a Solid State Drive device, and a Hard Disk Drive (HDD) device etc., for example. In addition, the auxiliary memory 93 can be a CD drive device, a DVD drive device, a BD drive device etc. The memory device is a silicon disk such as a non-volatile semiconductor memory (flash memory), a hard disk, a CD, a DVD, a BD, a Universal Serial Bus (USB) memory and a memory card etc.

The input unit 94 accepts operation instructions etc. from users. The input unit 94 is an input device including a pointing device such as an input button, a keyboard and a touch panel and an input device such as a wireless remote control, a microphone and a camera etc. In addition, the input unit 94 includes various sensors such as an infrared proximity sensor and a GPS receiver etc. Information input into the input unit 94 is transmitted to the CPU 91 via the connection bus B1.

The output unit 95 outputs data processed by the CPU 91 and data stored in the main memory 92. The output unit 95 is an output device such as a Cathode Ray Tube (CRT) display, a Liquid Crystal Display (LCD), a Plasma Display Panel (PDP), an Electroluminescence (EL) panel, an organic EL panel, a speaker etc. The communication unit 96 is an interface for the network N etc.

Figure 2B:
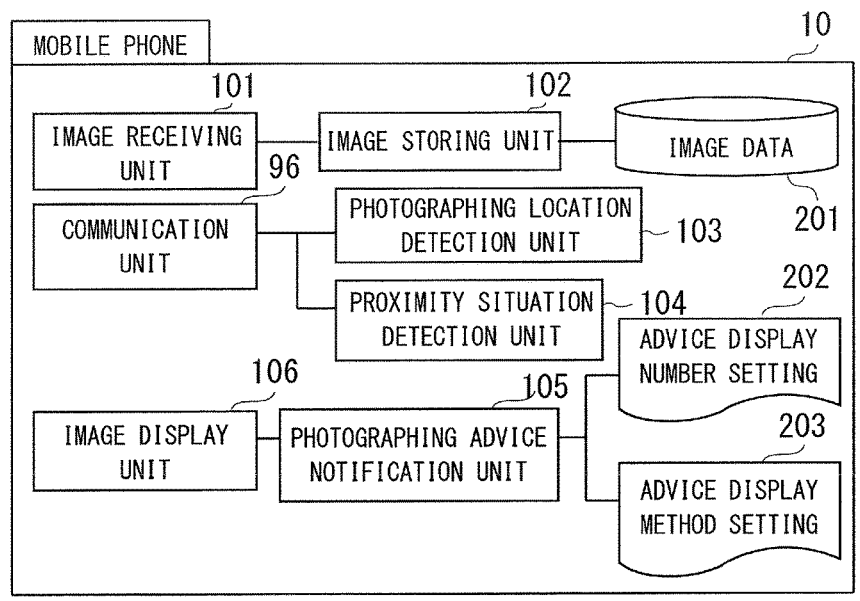
FIG. 2B is a diagram illustrating a functional configuration of a photographing apparatus according to an embodiment.

The information processing apparatus 90 as a photographing apparatus 10 achieves each functional unit as illustrated in FIG. 2B when the CPU 91 reads OSs, programs and data stored in the auxiliary memory 93 and deploy the read OSs, programs and data on the main memory 92.

For example, the information processing apparatus 90 as the photographing apparatus 10 achieves functions as an image receiving unit 101, an image storing unit 102, a photographing location detection unit 103, a proximity situation detection unit 104, a photographing advice notification unit 105 and an image display unit 106. In addition, the information processing apparatus 90 as the photographing apparatus 10 includes an image data DB 201, an advice display number setting table 202 and an advice display method setting table 203 provided in the auxiliary memory 93 which each functional unit as above references or in which data used by each functional unit is stored.

The information processing apparatus 90 as the photographing apparatus 10 uses the functional units as above to output information of images being photographed by the input unit 94 of the camera to the network N. In addition, the photographing apparatus 10 uses the GPS function to acquire the location information of the photographing apparatus 10 which is photographing the images and output the acquired location information to the network N. Further, the photographing apparatus 10 receives photographing advice information for the photographing situation in which the images are being photographed via the network N. The photographing apparatus 10 uses the received photographing advice information to display the advice information on the output device of the monitor such as the EL panel of the photographing apparatus 10. The user of the photographing apparatus 10 can receives the photographing advice according to the photographing situation in which the images are being photographed on the monitor.

Figure 2C:
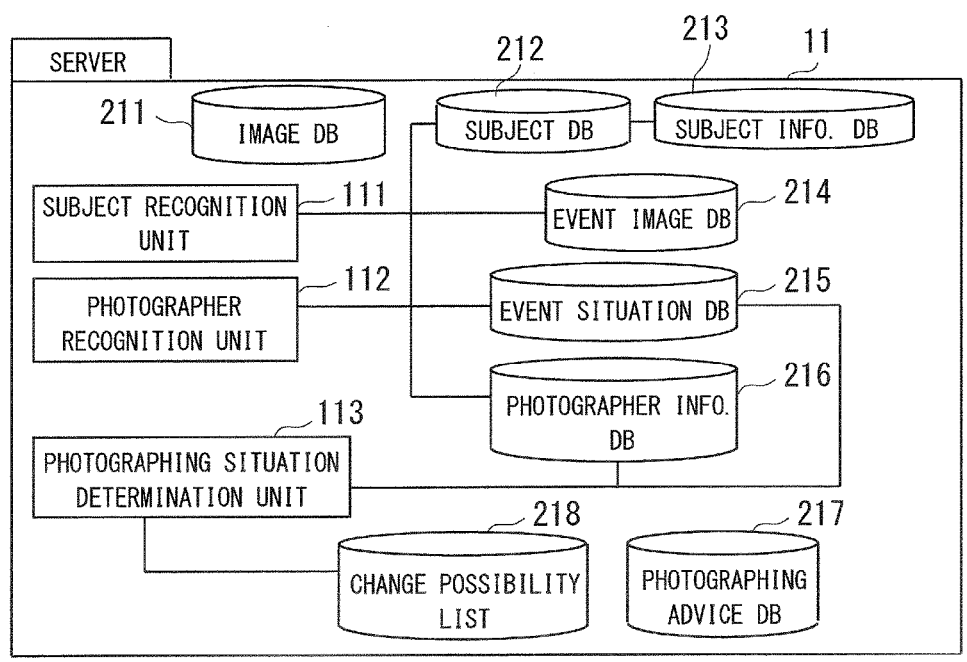
FIG. 2C is a diagram illustrating a functional configuration of an information processing apparatus according to an embodiment.

The information processing apparatus 90 as the information processing apparatus 11 achieves each functional unit as illustrated in FIG. 2C when the CPU 91 reads OSs, programs and data stored in the auxiliary memory 93 and deploy the read OSs, programs and data on the main memory 92.

For example, the information processing apparatus 90 as the information processing apparatus 11 achieves functions as a subject recognition unit 111, a photographer recognition unit 112 and a photographing situation determination unit 113 as illustrated in FIG. 2C. In addition, the information processing apparatus 90 as the information processing apparatus 11 includes an image DB 211, a subject DB 212, a subject information DB 213, an event image DB 214 and an event situation DB 215 which each functional unit as above references or in which data used by each functional unit is stored. Further, the information processing apparatus 90 as the information processing apparatus 11 includes a photographer information DB 216 and a photographing advice DB 217 provided in the auxiliary memory 93. It is noted that the auxiliary memory 93 of the information processing apparatus 11 stores a change possibility list 218 and template data for determining a feature of a face of a subject in an image.

The information processing apparatus 11 uses the functional units as above to acquire information of the images which is being photographed from photographing apparatuses 10 connected with the network N and to acquire information of the locations of the photographing apparatuses 10. In addition, the information processing apparatus 11 gathers the information of the images as photographing records from the photographing apparatuses 10 connected with the network N and stores the gathered information in the auxiliary memory 93.

The information processing apparatus 11 uses the information of the images stored in the auxiliary memory 93 to determine ranks of the photographers indicating the skill levels of photographing. In addition, the information processing apparatus 11 calculates for each subject composition in each image stored in the auxiliary memory 93 the frequency of the appearance of the subject and the subject point based on the frequency of the appearance of the subject and the photographer's skill level.

The information processing apparatus 11 uses information regarding the subject, the presence of subject, the photographer, other photographers within the predetermined area of the photographing apparatus 10 which are identified in the received image to recognize the photographing situation of each photographing apparatus. Further, the information processing apparatus 11 generates advice information for encouraging other users to join as subjects in the image which is being photographed or asking the other users to photograph the image in place of the user of the photographing apparatus 10.

Therefore, the information processing apparatus 11 can provide advice for another photographing apparatus 10 within the predetermined range of the photographing apparatus 10 for encouraging the photographer using the other photographing apparatus 10 to join in the photographing image as a subject. In addition, the information processing apparatus 11 can provide advice for the other photographing apparatus 10 for asking the photographer of the other photographing apparatus 10 to photograph an image on the scene.

It is noted that any of the functional units as above included in the information processing apparatus 11 can be included in another information processing apparatus. For example, an information processing apparatus including the subject recognition unit 111, an information processing apparatus including the photographer recognition unit 112 and an information processing apparatus including the photographing situation determination unit 113 which are connected with the network N can function as the information processing apparatus 11 as described above. Similarly, each DB included in the information processing apparatus 11 as above can be stored in different storage devices which are connected with the network N. Further, the functional units of the information processing apparatus 11 can be provided in different information processing apparatuses and the DBs can be provided in different information processing apparatuses to reduce the load on performing the processes of the functional units.

(Functional Block Configuration)

Figure 3:
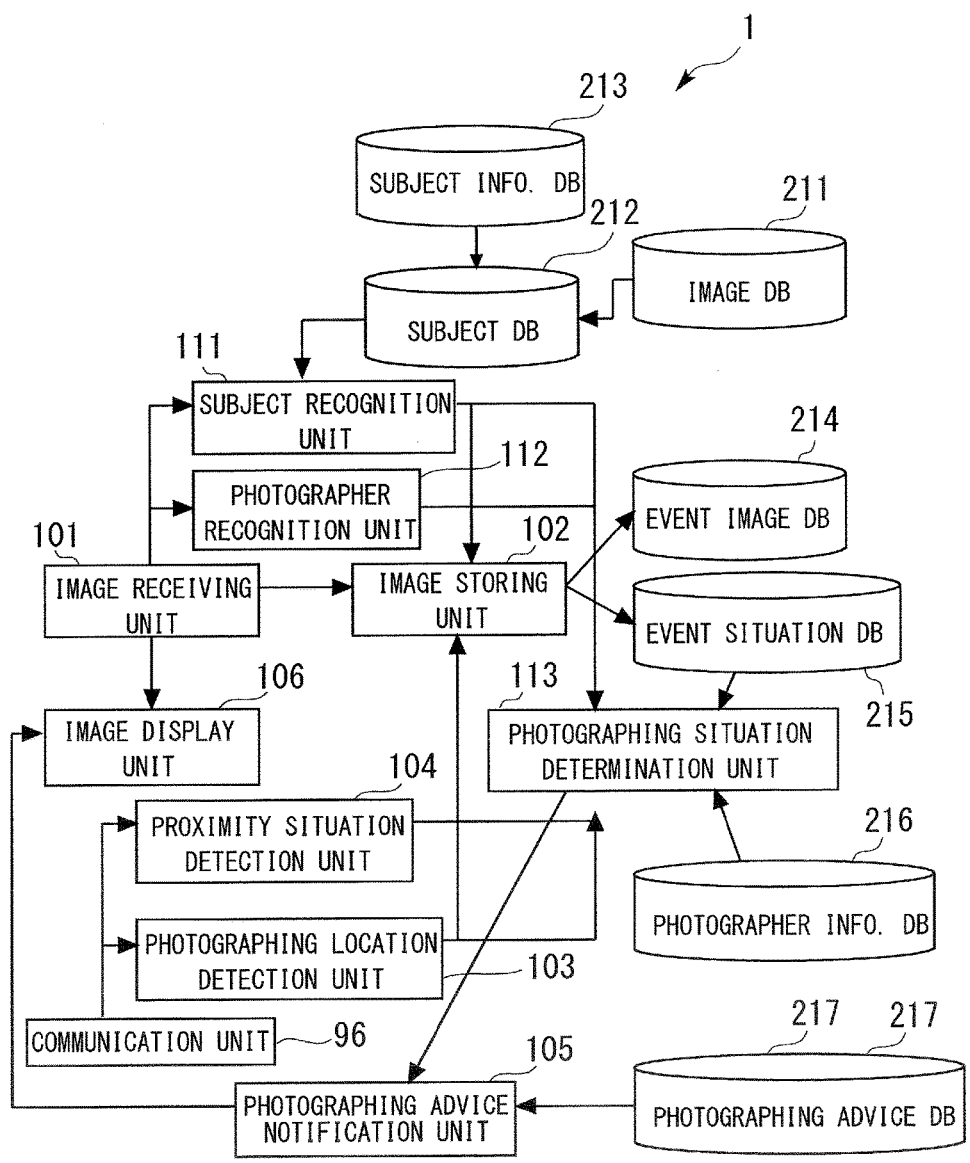
FIG. 3 is a diagram illustrating functional configuration of a photographing assisting system according to an embodiment.

FIG. 3 is a diagram illustrating a functional configuration of the photographing assisting system 1. The diagram in FIG. 3 illustrates a transition between the functional configuration of the photographing apparatus 10 illustrated in FIG. 2B and the functional configuration of the information processing apparatus 11 illustrated in FIG. 2C.

In the diagram in FIG. 3, the subject recognition unit 111, the photographer recognition unit 112 and the photographing situation determination unit 113 are achieved by the CPU 91 of the information processing apparatus 11 to execute computer programs deployed on the main memory 92. The same can be applied to the image receiving unit 101, the image storing unit 102, the photographing location detection unit 103, the proximity situation detection unit 104, the photographing advice notification unit 105 and the image display unit 106. For example, each functional unit as described here are achieved by the CPU 91 of the photographing apparatus 10 to execute computer programs deployed on the main memory 92.

In addition, in the diagram in FIG. 3, the image DB 211, the subject DB 212, the subject information DB 213, the event image DB 214, the event situation DB 215, the photographer information DB 216 and the photographing advice DB 217 are built on the auxiliary memory 93. It is noted that the auxiliary memory 93 of the information processing apparatus 11 stores the change possibility list 218 and template data for determining facial features on the subjects included in the images. The template data includes data with various image sizes. The information processing apparatus of the photographing assisting system 1 reference each DB built on the auxiliary memory 93 and performs processes of each functional unit as a data storage location.

(Photographing Apparatus 10)

In the diagram in FIG. 3, the image receiving unit 101 accepts image which is being photographed by a photographing apparatus such as a camera of the photographing apparatus 10. The image includes subjects which are being photographed. The subject composition includes the arrangement of the subjects in the image, the positions of the subjects in the image and the postures of the subjects etc. The images accepted by the image receiving unit 101 are temporarily stored in a predetermined area of the main memory 92 of the photographing apparatus 10 along with photographing information such as Exchangeable Image File Format (Exif). It is noted that Exif is attribute information added to images photographed by digital cameras and is a standard proposed by Japanese Electronic Industry Development Association (JEIDA).

The Exif information includes the photographing date of the image, the model name of the photographing apparatus 10, the manufacturer name of the photographing apparatus 10, the resolution of the image, the shutter speed of the photographing apparatus 10, the aperture of the photographing apparatus 10, the photographing mode of the photographing apparatus 10, the focal length of the photographing apparatus 10. In addition, when the photographing apparatus 10 includes an electronic compass or a GPS function, the Exif information also includes the photographing direction, the location information such as the latitude, the longitude and the altitude.

The image receiving unit 101 provides the image which is being photographed for the image storing unit 102 and the image display unit 106 of the photographing apparatus 10. In addition, the image receiving unit 101 transmits the image which is being photographed to the network N via the communication unit 96 of the photographing apparatus 10. The image transmitted to the network N is received by the information processing apparatus 11 connected with the network N, for example. The image received by the information processing apparatus 11 is provided for the subject recognition unit 111 and the photographer recognition unit 112 of the information processing apparatus 11.

The image storing unit 102 stores the image provided by the image receiving unit 101 as image data when a user operation of the operation input button of the input unit 94 such as a shutter occurs. The image storing unit 102 stores the image as image record in the image data DB 201 built on the auxiliary memory 93 of the photographing apparatus 10 as illustrated in FIG. 2B, for example. Further, the image storing unit 102 stores the additional information related to the event along with the image provided by the image receiving unit 101 in the event image DB 214 and the event situation DB 215 connected with the network N. The image storing unit 102 stores the image in the event image DB 214 and stores the additional information related to the event in the event situation DB 215, for example.

The additional information includes the subject information of the subject recognized by the subject recognition unit 111 of the information processing unit 11 and the photographer information of the photographer recognized by the photographer recognition unit 112, for example. The subject information is determined based on the image transmitted by the image receiving unit of the photographing apparatus 10. The photographer information is determined based on the information for identifying the photographing apparatus 10 and the image of the photographer etc.

Further, the additional information includes the information of the location of the photographing apparatus 10 detected by the photographing location detection unit 103 and the information of other photographing apparatuses in a proximity area of the photographing apparatus 10 which are detected by the proximity situation detection unit 104. It is noted that when the photographing apparatus includes a function such as an electronic compass, the photographing direction detected by the function can be included in the additional information.

Moreover, when the Exif information is added to the image, the image storing unit 102 stores the image along with the Exif information in the event image DB 214 and stores the additional information and the Exif information in the event situation DB 215 as reference information. The photographing assisting system 1 separates the location for storing image record including the image and the location for storing the reference information. In addition the photographing assisting system 1 shares the information stored in the event situation DB 215 with the participants of the event as information for consolidating the photographing situations in the event. Since the shared information stored in the event situation DB 215 does not include images, images which the participants do not wish to share with other participants cannot be shared involuntarily.

The photographing location detection unit 103 detects the location of the photographing apparatus 10 which is photographing the image. When the photographing apparatus includes a GPS function, the photographing location detection unit 103 activates the GPS function to acquire the latitude and longitude of the photographing apparatus 10 as the location information. It is noted that the location information of the photographing apparatus 10 can be determined based on the distance between the photographing apparatus 10 and a wireless base station in a mobile telephone network included in the network N, for example. The photographing location detection unit 103 stores the location information of the detected photographing apparatus 10 in a predetermined area of the main memory 92, for example. The photographing location detection unit 103 provides the location information of the detected photographing apparatus 10 for the image storing unit 102 and for the photographing situation determination unit 113 of the information processing apparatus 11 connected with the network N via the communication unit 96.

It is noted that when the photographing apparatus 10 includes a function such as an electronic compass, the photographing location detection unit 103 can acquire the direction information of the photographing direction detected by the function of the electronic compass, for example. The direction information can be represented by a relative angle between the photographing direction and the true north direction in a clockwise rotation. The relative angle ranges from 0 to 360. The acquired direction information is provided for the image storing unit 102 and the photographing situation determination unit 113 of the information processing apparatus 11 connected with the network N, for example.

The proximity situation detection unit 104 detects other photographing apparatuses within a predetermined range of the photographing apparatus 10. For example, the proximity situation detection unit 104 acquires a list of information of the locations of photographing apparatuses of other participants of an event from the information processing apparatus 11 connected with the network N. And the proximity situation detection unit 104 calculates the relative distances between the photographing apparatus 10 and the detected other photographing apparatuses based on the acquired location information and the location information of the photographing apparatuses detected by the photographing location detection unit 103. In addition, the proximity situation detection unit 104 detects the other photographing apparatuses within the predetermined range of the photographing apparatus 10 based on the magnitude relationship of the relative distances between the photographing apparatus 10 and the other photographing apparatuses.

The proximity situation detection unit 104 generates a proximity apparatus list in which photographing apparatuses are arranged from shortest to longest regarding the calculated relative distances and temporarily stores the list in a predetermined area on the main memory 92. It is noted that the proximity apparatus list can be generated by using a threshold to determine the magnitude relationship of the relative distances. For example, the proximity situation detection unit 104 can be configured to generate the proximity apparatus list of other photographing apparatuses of which the relative distances are smaller than the threshold. The proximity situation detection unit 104 can be configured to generate a proximity apparatus list of other photographing apparatuses for which the relative distances from the photographing apparatus 10 is smaller than a threshold. Since such a threshold for determining the magnitude relationships of the relative distances is used, the search of the other photographing apparatuses can be refined. The threshold for determining the magnitude relationships of the relative distances can arbitrarily be defined according to the size of the event, the venue of the event, the time of the event and the number of the participants of the event etc.

The proximity situation detection unit 104 transmits the generated proximity apparatus list to the photographing situation determination unit 113 of the information processing apparatus connected with the network N via the communication unit 96. It is noted that the function of the proximity situation detection unit 104 can be included in the information processing apparatus 11. For example, the information processing apparatus 11 gathers information of the locations of the photographing apparatuses 10 connected with the network N in the event. The information processing apparatus 11 calculates the relative distances between the photographing apparatus 10 which is photographing images and the other photographing apparatuses based on the gathered information of the locations of the other photographing apparatuses. The information processing apparatus 11 generates the proximity apparatus list of the photographing apparatus which is photographing images and the other photographing apparatuses based on the calculated relative distances and provide the proximity apparatus list for the photographing situation determination unit 113. When the function of the proximity situation detection unit 104 is included in the information processing apparatus 11, the processing load of the photographing apparatus 10 can be reduced.

The photographing advice notification unit 105 reference to the photographing advice DB 217 to determine an advice for a photographing technique regarding a subject composition etc. by using the change possibility information for the photographing situation notified from the photographing situation determination unit 113. The advice can include a request for other skillful photographers near the photographer of the photographing apparatus which is photographing images to photograph images. The photographing advice notification unit 105 temporarily stores the information of the advice determined by referencing the photographing advice DB 217 in a predetermined area in the main memory 92 and provides the information of the advice for the image display unit 106. The descriptions of the process for notifying the photographing advice performed by the photographing advice notification unit 105 are provided below with reference to FIG. 6J.

The image display unit 106 displays the images provided by the image receiving unit 101 on a display device such as an EL panel connected with the output unit 95 of the photographing apparatus 10. The image display unit 106 displays the attribute information such as Exif information with the images to overlap the images which is being displayed. In addition, the image display unit 106 also displays the advice provided by the photographing advice notification unit 105 to overlap the images which is being displayed. The advice determined by the photographing advice notification unit 105 is provided for the user of the photographing apparatus 10 via the display device in this manner.

(Information Processing Apparatus 11)

In FIG. 3, the subject recognition unit 111 analyzes the images transmitted by the photographing apparatus 10 via the network N and recognizes subjects in the subject compositions of the images. The recognition of the subjects can be achieved by a face recognition technique, for example. The subject recognition unit 111 receives the images transmitted by the photographing apparatus 10 via the network N and temporarily stores the received images in a predetermined area in the main memory 92. The subject recognition unit 111 detects the faces of the subjects in the subject compositions of the received images to determine the face areas of the subjects. In addition, the subject recognition unit 111 performs a face recognition process to the determined face areas. The face recognition process performed by the subject recognition unit 111 is described below with reference to FIG. 6C.

The subject recognition unit 111 references to the image DB 211, the subject DB 212 and the subject information DB 213 to perform verification such as pattern matching between the determined face area of the subject and the information of the faces included in the images stored in the image DB 211. When the verification indicates that the degree of matching is equal to or more than a predetermined threshold, the subject recognition unit 111 determines that the subject included in the image is a subject which is registered in the subject DB 212. On the other hand, when the verification indicates that the degree of matching is smaller than the predetermined threshold, the subject recognition unit 111 determines that the subject included in the image is a subject which is not registered in the subject DB 212.

When the subject recognition unit 111 determines that the subject included in the image is a subject which is registered in the subject DB 212, the subject recognition unit 111 transmits the information of the subject registered in the subject DB 212 to the photographing apparatus 10 connected with the network N via the communication unit 96. The information of the subject includes identification (ID) for uniquely identifying the subject, a name of the subject registered in the subject DB 212 etc. The information of the subject received by the photographing apparatus 10 is notified to the image storing unit 102. In addition, when the subject recognition unit 111 determines that the subject included in the image is a subject which is registered in the subject DB 212, the subject recognition unit 111 provides the information of the subject registered in the subject DB 212 for the photographing situation determination unit 113.

It is noted that there is not a restriction on the notification process to the photographing apparatus 10 performed by the subject recognition unit 111 when the subject recognition unit 111 determines that the subject included in the image is a subject which is not registered in the subject DB 212. For example, the subject recognition unit 111 can notify the photographing unit of specific ID indicating that the determined subject is not registered in the subject DB 212. When the image storing unit 102 of the photographing apparatus 10 receives the specific ID, the image storing unit 102 can includes the specific ID in the additional information and store the image with the additional information. Further, the image storing unit 102 of the photographing apparatus 10 can store the image without including the specific ID in the additional information. Moreover, the subject recognition unit 111 can also provide the specific ID for the photographing situation determination unit 113.

The photographer recognition unit 112 determines the photographer photographing the image based on the information for identifying the photographing apparatus 10 such as the information received from the photographing apparatus 10 and the information along with the image. The photographer recognition unit 112 determines the photographer based on the information such as an address used by the photographing apparatus for transmitting the image. The photographer recognition unit 112 can store in advance a photographer list in which the photographer and the address used by the photographing apparatus for transmitting the image are associated with each other. The association of the address and the photographer can be generated when the image is registered in the information processing apparatus 11 in the photographing assisting system 1. The photographer recognition unit 112 can reference to the photographer list stored in the auxiliary memory 93 etc. to associate the address and the photographer when the photographer recognition unit 112 receives the image from the photographing apparatus via the network N.

In addition, when the photographing apparatus 10 includes imaging devices such as an in-camera device for photographing the photographer and an out-camera device for photographing the subject, the photographer can be determined based on an image photographed by the imaging devices. For example, the photographer recognition unit 112 can determine the photographer in the mage by using the face recognition technique in the same manner as the subject recognition unit 111. The photographer recognition unit 112 performs verification such as pattern matching between the determined face area of the subject and the information of the faces included in the images stored in the image DB 211. When the verification indicates that the degree of matching is equal to or more than a predetermined threshold, the photographer recognition unit 112 determines that the subject included in the image is a subject which is registered in the subject DB 212.

The photographer recognition unit 112 transmits the information of the photographer determined based on the image received from the photographing apparatus 10 to the photographing apparatus 10 connected with the network N via the communication unit 96. It is noted that the information of the photographer includes identification for uniquely identifying the photographer, a name of the photographer registered in the photographer DB 216 etc. The information of the photographer received by the photographing apparatus 10 is notified to the image storing unit 102, for example. In addition, the photographer recognition unit 112 provides the information of the photographer for the photographing situation determination unit 113.

The photographing situation determination unit 113 recognizes a photographing situation in the event based on the image received from the photographing apparatus 10. The photographing situation determination unit 113 gathers the information of the subject recognized by the subject recognition unit 111 and the information of the photographer recognized by the photographer recognition unit 112. The photographing situation determination unit 113 gathers the information of the location of the photographing apparatus 10 detected by the photographing location detection unit 103 and the proximity apparatus list generated by the proximity situation detection unit 104 via the network N.

The photographing situation determination unit 113 references to the gathered information and the photographer information DB 216 to determine the photographer of the image and the skill levels of other photographers in the event. In addition, the photographing situation determination unit 113 references to the gathered information and the event situation DB 215 to determine the frequency of photographing in the past regarding the subject composition of the image and the subject point etc. The photographing situation determination unit 113 determines the point in case that the current photographing situation is changed to generate the change possibility list 218. And the photographing situation determination unit 113 transmits the generated change possibility list 218 or a notification of the generation of the change possibility list 218 to the photographing apparatus 10 from which the image is received. The details of the photographing situation determination process performed by the photographing situation determination unit 113 are described below with reference to FIG. 6G.

The photographing advice notification unit 105 of the photographing apparatus 10 receives the generated change possibility list 218 or a notification of the generation of the change possibility list 218. The photographing advice notification unit 105 references to the photographing advice DB 217 based on the received information to determine advice information to be displayed on the display device such as an EL panel of the photographing apparatus 10. The advice information determined by the photographing advice notification unit 105 includes a plurality of pieces of advice.

(Database Configurations)

FIG. 4A illustrates an example of the image DB 211. The image DB 211 stores images gathered and stored by the information processing apparatus 11 of the photographing assisting system 1. The images stored in the image DB 211 include images photographed by the photographing apparatus 10 in events. The event image DB 214 stores the photographed images in the format as illustrated in FIG. 4A.

The image DB 211 as illustrated in FIG. 4A includes columns of "File Index", "File Name", "Storage Destination", "Image Type", "Photographing Date", "Photographing Location" and "Photographer ID". The "File Index" column stores identification information for uniquely identifying the images. The identification information stored in the "File Index" can be determined by the administrator of the photographing assisting system 1 or the information processing apparatus 11. The "File Name" column stores file names of the images photographed by the photographing apparatus 10. The "Storage Destination" column stores paths of folders which stores the file names of the images photographed by the photographing apparatus 10. It is noted that the folders storing the images include folders provided in the auxiliary memory 93 of the photographing apparatus 10.

The "Image Type" column stores the types of the images photographed by the photographing apparatus 10. In the example of FIG. 4A, a type "P" indicating that the image is a still image such as a photograph and a type "M" indicating that the image is a moving image such as a video are stored in the column. The types of the images can be determined by the extensions such as ".jpg" and ".mpg" of the file names stored in the "File Name" column. The information processing apparatus 11 can determine the types of the images according to the extensions stored in the "File Name" column.

The "Photographing Date" column stores the dates on which the photographing apparatus 11 photographs the images. The photographing dates stored in the "Photographing Date" column is represented by a four-digit year of grace, a two-digit month, a two-digit day, a two-digit hour, a two-digit minute and a two-digit second. The photographing dates can be determined by the Exif information or the time stamps added to the images.

The "Photographing Location" column stores the locations where the images are photographed by the photographing apparatus 10. The locations in the "Photographing Location" column include the latitudes and longitudes obtained by the GPS function, for example. The location information stored in the "Photographing Location" column includes the location relationship between the photographing apparatus 10 and a communication base station and the latitude and longitude determined by the location of the photographing apparatus 10 indicated on a map.

The "Photographer ID" column stores photographer identification information (photographer ID) for uniquely identifying the photographers of the images. The photographer identification information stored in the "Photographer ID" column includes identification information registered in the photographing assisting system 1 upon the registration for use of the photographing assisting system 1, for example. When the photographer ID corresponds to address information used for the communication performed by the photographing apparatus 10, the address information can be stored in the "Photographer ID" column.

In the example in FIG. 4A, there is a record in which "3" is stored in the "File Index" column, "Photo002.jpg" is stored in the "File Name" column, "C:¥20100331" indicating the path to the folder in which the file "Photo002.jpg" is stored is stored in the "Storage Destination" column. In addition, "P" indicating the type of the photographed image is stored in the "Image Type" column and "2010/3/31 15:30:41" indicating the date and time when the image is photographed is stored in the "Photographing Date" column. Further, "North Latitude 43'34 East Longitude 133" indicating the location where the image is photographed is stored in the "Photographing Location" column and "1" indicating the user who photographs the image is stored in the "Photographer ID" column.

FIG. 4B illustrates an example of the subject DB 212. The subject DB 212 stores subject identification information (Subject ID) for uniquely identifying subjects in images in the image DB 211 and the names of the subjects in the images. It is noted that the subject information DB 213 administers the correspondence between the images stored in the image DB 211 and the subjects stored in the subject DB 212.

As illustrated in FIG. 4B, the subject DB 212 include the "Subject ID" column and the "Subject Name" column. The "Subject ID" stores subject identification information for identifying the subjects. The "Subject Name" column stores the names of the subjects etc. The information stored in the "Subject Name" column can be arbitrary names which the photographers of the images can recognize. For example, after the photographer photographs the image, the photographer checks the image and determines the name which is stored in the "Subject Name" column. In the example in FIG. 4B, a name "Friend A Male" is stored in the "Subject Name" column in the record in which "11" is stored in the "Subject ID" column. A name "Administrator" indicating the photographer of the image is stored in the "Subject Name" column in the record in which "1" is stored in the "Subject ID" column.

Figures 4C, 4D:
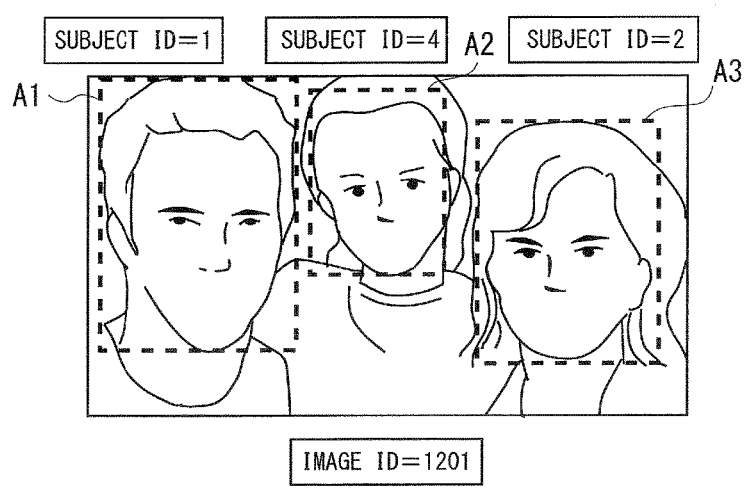
FIG. 4C is a diagram illustrating an example in a subject information database.
FIG. 4D is a diagram illustrating a subject area in image information.

FIG. 4C illustrates an example of the subject information DB 213. The subject information DB 213 stores subject information in which the images stored in the image DB 211 and the subjects stored in the subject DB 212 are associated. As illustrated in FIG. 4C, the subject information DB 213 includes the "Index" column, the "Image ID" column, the "Subject ID" column, the "Subject Area" column and the "Process Completed" column.

The "Index" column stores identification information for uniquely identifying the subjects stored in the subject information DB 213. The "Image ID" column stores identification information indicating the images stored in the image DB 211. The identification information stored in the "Image ID" column is the identification information stored in the "File Index" column in the image DB 211. The "Subject ID" column stores identification information indicating the subjects stored in the subject DB 212. The identification information stored in the "Subject ID" is the information stored in the "Subject ID" column in the subject DB 212. The "Subject Area" column stores the areas of the faces of the subjects in the images indicated by the identification information stored in the "Image ID". The areas of the faces of the subjects are information of the area processed by the face recognition technique.

The "Processed" column stores information indicating whether the subject accumulation process is completed. The details of the subject accumulation process are described below with reference to FIG. 5C. An example of the information indicating that the subject accumulation process is completed is binary status information using one bit. For example, "1" of the binary status information indicates that the subject accumulation process is completed and "0" of the binary status information indicates that the subject accumulation process is not completed. Information which indicates that the subject accumulation process is completed or that the subject accumulation process is not completed can be stored in the "Processed" column. For example, when the subject accumulation process is not completed, the "Processed" column can be empty or a string such as "ZZZ" can be stored in the "Processed" column.

FIG. 4D illustrates a diagram of a subject area in an image. The diagram in FIG. 4D illustrates an image for which "1201" is stored in the "File Index" column in the image DB 211. The image illustrated in FIG. 4D is a still image photographed with an Half-Video Graphics Array (HVGA) standard and 480 (horizontal)×320 (vertical) pixels. In the image in FIG. 4D includes subjects for which the IDs in the "Subject ID" in the subject DB 212 are "1", "2" and "4".

In the image in FIG. 4D, the image area of the face of the subject processed by the face recognition technique for which the "Subject ID" is "1" is the area A1 within a rectangular area depicted by broken lines. In addition, the image area of the face of the subject processed by the face recognition technique for which the "Subject ID" is "4" is the area A2 within a rectangular area depicted by broken lines. Further, the image area of the face of the subject processed by the face recognition technique for which the "Subject ID" is "2" is the area A3 within a rectangular area depicted by broken lines.

The area information stored in the "Subject Area" column in the subject information DB 213 can be represented by converting the pixel in the image into the coordinate and using a formula "(coordinate at the upper left corner)–(coordinate at the lower right corner" of the rectangular area for the face of the subject in the image. For example, the still image in FIG. 4D can be represented by setting the coordinate at the upper left corner as (0,0) and the coordinate at the lower right corner as (319,479). Therefore, each rectangular area which includes a face of a subject in the still image can be represented by using the coordinate ranging from (0,0) to (319,479). When the pixel in the photographed image is represented by the coordinate, the areas of the face areas of the subjects can be determined.

In the example of the subject information DB 213 in FIG. 4C, "(13,0)-(157,220)" is stored as area information in the "Subject Area" column for the record in which "223" is stored in the "Index" column. The record in which "223" is stored in the "Index" column indicates that the face area of the subject for which the "Subject ID" is "1" in the still image for which the "Image ID" is "1201" exists in a rectangular area represented by "(13,0)-(157,220)". In the example of the image in FIG. 4D, the area A1 of the face area of the subject for which the "Subject ID" is "1" exists in a rectangular area represented by the coordinate at the upper left corner (13,0) and the coordinate at the lower right corner (157,220).

In addition, the record in which "224" is stored in the "Index" column indicates that the face area of the subject for which the "Subject ID" is "2" in the still image for which the "Image ID" is "1201" exists in a rectangular area represented by "(311,38)-(458,232)". Further, the record in which "224" is stored in the "Index" column indicates that the face area of the subject for which the "Subject ID" is "4" in the still image for which the "Image ID" is "1201" exists in a rectangular area represented by "(181,12)-(289,159)".

In the examples in FIGS. 4C and 4D, the subject area information can be represented by converting the pixel in the image into the coordinate and using a formula "(coordinate at the upper left corner)–(coordinate at the lower right corner" of the rectangular area for the face of the subject in the image. However, the face area can be determined by using other methods. For example, the face area can be determined by using the coordinate at the upper left corner of the face area and the size of the face area represented by the coordinate. In the example in FIG. 4D, the subject area information of the face area of the subject for which the "Subject ID is "2" can be represented as "(311,38)-(147× 194)".

The event situation DB 215 includes a subject accumulation information table 215a, a photographer table 215b and a photographing location table 215c. The subject accumulation information table 215a stores information indicating that each participant of an event is stored as a subject in an image. The photographer table 215b stores information of photographers corresponding to participants of an event among the photographers registered in the photographer information DB 216. The photographing location table 215c stores information of locations where images are photographed in an event.

FIG. 4E illustrates an example of the subject accumulation information table 215a. As illustrated in FIG. 4E, the subject accumulation information table 215a includes a "Subject ID" column, a "Subject Name" column, a "Subject Frequency" column and a "Subject Point" column. The "Subject ID" column and the "Subject Name" column are the columns as described above with reference to FIG. 4B etc. The "Subject Frequency" column stores information regarding the frequency of photographing the subject in the images stored in the image DB 211. The "Subject Point" column stores points reflecting the photographing situations in which the subjects are photographed in the images. The details of the "Subject Frequency" column and the "Subject Point" column in the subject accumulation information table 215a are described below with reference to FIG. 5C.

FIG. 4F illustrates an example of the photographer information DB 216. The photographer information DB 216 stores information of photographers of the images stored in the image DB 211. As illustrated in FIG. 4F, the photographer information DB 216 includes a "Photographer ID" column, a "Photographer Name" column and a "Skill Level" column. The "Photographer ID" column stores identification information for uniquely identifying the photographers. The "Photographer Name" column stores the names etc. of the photographers. The information stored in the "Photographer Name" can be pen names etc. which distinguish from the other photographers of the images stored in the image DB 211. In the example in FIG. 4F, "Friend A Male" is stored in the "Photographer Name" in the record in which "11" is stored in the "Photographer ID" column.

The "Skill Level" column stores ranks indicating the skillfulness of the photographing technique of the photographers. The skillfulness can be represented by using a plurality of ranks such as "A (Advanced)", "B (Intermediate)" and "C (Beginning)". The ranks indicating the skillfulness of the photographing technique can be calculated relatively based on the number of images photographed by the photographing apparatus 10, for example. This is because it is estimated that the number of images is larger, the skillfulness is higher. The ranks indicating the skillfulness can reflect the duration of use of the photographing apparatus 10. This is because it is estimated that the duration of use of the photographing apparatus 10 is longer, the amount of knowledge of the photographer regarding the technique of using the photographing apparatus 10, the usage of the photographing apparatus 10, the compositions of images, the aperture and the shutter speed of the photographing apparatus 10 and the selection of the lens used for the photographing apparatus 10 is larger. In addition, the ranks indicating the skillfulness can reflect other photographers' evaluation of the images which is published in a Social Networking Service (SNS) etc. via the network N by the photographer of the images. For example, the ranks indicating the skillfulness can be relatively calculated based on the number of "Nice" given to the published images.

It is noted that the ranks indicating the skillfulness stored in the "Skill Level" column in the photographer information DB 216 are preferably based on the images stored in the image DB 211. This is because the skillfulness of each photographer can be quantitatively and objectively evaluated based on the images stored in the image DB 211.

As an example of the determination of the ranks, the rank "C" is given to a photographer by whom the number of images photographed is smaller than 400. The rank "B" is given to a photographer by whom the number of images photographed is equal to or more than 400 and smaller than 800. The rank "A" is given to a photographer for whom the number of images photographed is equal to or more than 800. It is noted that the number of images includes the number of still images such as pictures and the number of moving images such as video. For example, when the number of still images photographed by a photographer is 100 and the number of still images photographed by the photographer is 100, the number of images based on which a rank is given to the photographer is 200.

In the example in FIG. 4F, the rank "A" is stored in the "Skill Level" column in the record in which the "Photographer ID" is "1" or "12". In addition, the rank "B" is stored in the "Skill Level" column in the record in which the "Photographer ID" is "11". Further, the rank "C" is stored in the "Skill Level" column in the record in which the "Photographer ID" is "2" or "13".

In the example in FIG. 4F, it can be determined that the photographers for whom the "Photographer ID" is "1" or "12" are more skillful than the photographers for whom the "Photographer ID" is "2", "11" or "13". In addition, it can be determined that the photographer for whom the "Photographer ID" is "11" is more skillful than the photographers for whom the "Photographer ID" is "2" or "13".

The ranks can also be determined based on the rate of failure such as camera shake among the photographed images. Further, the ranks can also be determined based on the product information such as the types of lens used for photographing the images.

(Process Flow)

The photographing assisting processes performed by the photographing assisting system 1 according to the present embodiment with reference to FIGS. 5A to 5D and 6A to 6N. In the photographing assisting system 1, the information processing apparatus 11 detects a photographing opportunity by receiving an image which is being photographed from photographing apparatus 10 of each photographer in an event. For example, the information processing apparatus 11 determines a subject in the received image and a photographer of the received image. In addition, the information processing apparatus 11 determines a photographing location of the photographing apparatus 10 and other photographers within the predetermined range of the photographer of the photographing apparatus 10. For example, the information processing apparatus 11 uses the determined photographer, the determined subject, the determined photographing location and the other photographers within the predetermined range of the photographer of the photographing apparatus 10 to determine a photographing situation. In addition, the information processing apparatus generates the change possibility information of a photographer, a subject and a photographing location as photographing advice information based on the determined photographing situation. Each photographing apparatus 10 determines advice on photographing based on the photographing advice information generated according to the photographing situation. The advice on photographing determined by each photographing apparatus 10 is displayed on the monitor etc. of each photographing apparatus 10.

The photographer of the photographing apparatus 10 can encourage other users to join as subjects in the image which is being photographed and can ask the other users to photograph the image in place of the user. The photographing assisting system 1 according to the present embodiment can encourage communications among the photographers in the event. Further, the photographing assisting system 1 uses the photographing advice information to enhance the communications between the participants in the event. Therefore, when such mutual exchanges are enhanced, opportunities of photographing images for the participants can be increased to adjust the unevenness of the opportunities.

Figure 5A:
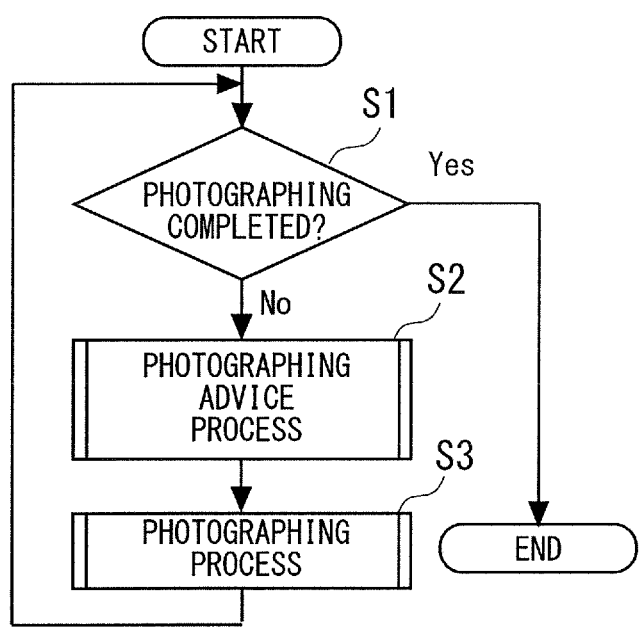
FIG. 5A is a diagram illustrating an example of a flowchart of a photographing assisting process.

FIG. 5A illustrates an example of a flowchart of photographing assisting processes related to photographing of images in an event. In the flowchart in FIG. 5A, the processes are initiated when a photographing apparatus 10 such as a camera accepts an image which is being photographed in the event, for example. The image accepted by the photographing apparatus 10 is transmitted to the information processing apparatus 11 via the network N with attribute information such as Exif information added, for example.

In the flowchart in FIG. 5A, when the photographing apparatus 10 in the photographing assisting system 1 accepts an image which is being photographed, the photographing apparatus 10 determines whether the photographing of the image is terminated (S1). When an operation related to the photographing does not occur before a certain period elapses after the image is accepted by the photographing apparatus 10 (S1: Yes), the photographing apparatus 10 terminates the photographing assisting process. It is noted that the operation related to the photographing includes operations for the photographing mode, the aperture, the shutter speed and the focus slide etc. When the photographing apparatus 10 in the photographing assisting system 1 does not detect an operation related to the photographing within a time period such as 30 seconds and 1 minute after the photographing apparatus 10 accepts the image, the photographing apparatus 10 terminates the photographing assisting processes.

On the other hand, when an operation related to the photographing occurs before a certain period elapses after the image is accepted by the photographing apparatus 10 (S1: No), the photographing apparatus 10 performs the photographing assisting processes S2 to S3 to the image. The photographing assisting system 1 performs the photographing assisting process based on the image accepted by the photographing apparatus 10 (S2) and stores the image as image data (S3).

The photographing assisting process in S2 in FIG. 5A is described with reference to a flowchart in FIG. 6A, and the photographing process in S3 in FIG. 5A is described with reference to a flowchart in FIG. 5B.

The image accepted by the photographing apparatus 10 can be an scenery image in which a subject is not included, for example. Therefore, the photographing assisting system 1 according to the present embodiment determines a photographing situation among images including images with or without subjects.

(Photographing Processes)

Figure 5B:
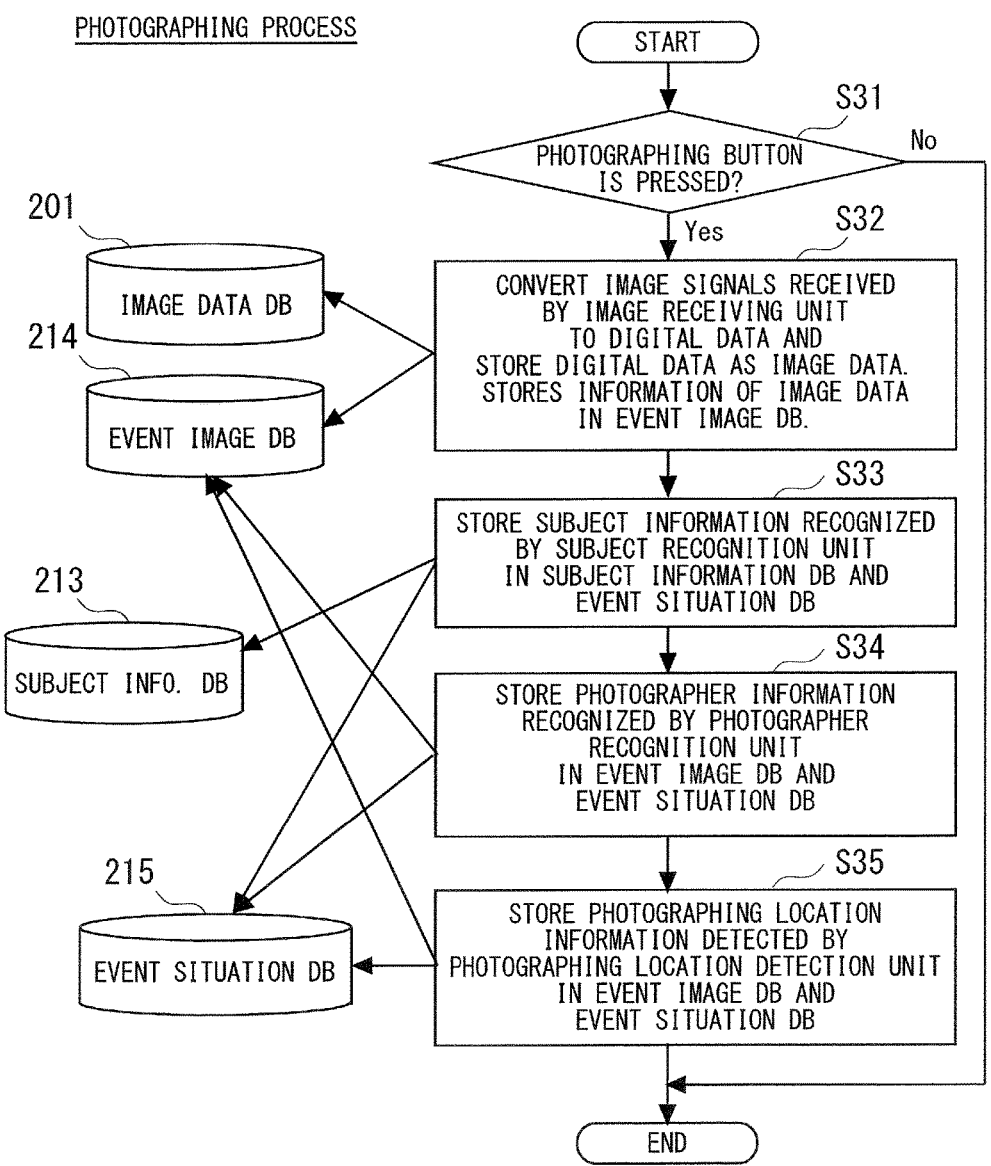
FIG. 5B is a diagram illustrating an example of a flowchart of a photographing process in S3 in FIG. 5A.

The photographing processes in S3 in FIG. 5A is described here with reference to a flowchart in FIG. 5B. In the photographing processes, the photographing apparatus in the photographing assisting system 1 determines the image to be stored when an operation to a button for photographing the image occurs. The image to be stored is stored in the image data DB 201 in the auxiliary memory 93 of the photographing apparatus 10, the event image DB 214 and the event situation DB 215 in the information processing apparatus 11.

In the flowchart in FIG. 5B, the photographing apparatus 10 in the photographing assisting system 1 detects pushing of the photographing button such as a shutter button (S31). When the photographing apparatus 10 does not detect the pushing of the photographing button (S31: No), the photographing apparatus 10 terminates the photographing processes to the image in FIG. 5B. On the other hand, the photographing apparatus 10 detects the pushing of the photographing button (S31: Yes), the photographing apparatus 10 performs the processes S32 to S35 and terminates the photographing processes to the image in FIG. 5B.

In S32, the photographing apparatus 10 converts the image accepted by the image receiving unit 101 to digital data and stores (which is also referred to as "records") the digital data as stored image in the image data DB 201 in the auxiliary memory 93. In addition, the photographing apparatus 10 also stores (records) the stored image in the auxiliary memory 93 in the event image DB 214 via the network N. The image stored in the event image DB 214 includes the reference information of the image and the attribute information such as the Exif information of the image. It is noted that the reference information is information stored in the "File Name" column and the "Storage Destination" column in the image DB 211 in FIG. 4A, for example. The attribute information such as the Exif information is information stored in the "Photographing Date" column and the "Photographing Location" column in the image DB 211 in FIG. 4A, for example.

In S33, the photographing apparatus 10 stores the information of a subject included in the image recognized by the subject recognition unit 111 in the event situation DB 215. The photographing apparatus 10 stores the information of the subject recognized by the subject recognition unit 111 in the "Subject ID" column and the "Subject Name" column in the subject accumulation information table 215a in the event situation DB 215 in FIG. 4E. For example, when a plurality of subjects are included in the image, the photographing apparatus 10 stores a subject ID in which subject IDs of the subjects in the image are combined with commas etc.

In addition, in S33, the information processing apparatus 11 in the photographing assisting system 1 stores the information of the subject(s) included in the image recognized by the subject recognition unit 111 in the subject information DB 213 when the information of the subject is stored in the subject accumulation information table 215a.

In addition, in S33, the information processing apparatus 11 detects writing of the information of the subject to the subject accumulation information table 215a of the photographing apparatus 10 by using an Application Programming Interface (API) etc. And the information processing apparatus 11 can store the information of the subject determined by the subject recognition unit 111 in the "Subject ID" column and the "Subject Area" column in the subject information DB 213 in FIG. 4C when the writing of the information of the subject is detected by the API etc. The storing of the information of the subject in the subject information DB 213 is performed for each subject. For example, the information processing apparatus 11 determines unique image identification information (image ID) for each image to store the information of the subject determined by the subject recognition unit 111. The image identification information determined by the information processing apparatus 11 is stored in the "Image ID" column in the subject information DB 213, for example.

In S34, the photographing apparatus 10 stores the information of the photographer determined by the photographer recognition unit 112 in the event image DB 214 and the event situation DB 215. The photographing apparatus 10 stores the information of the photographer determined by the photographer recognition unit 112 in the "Photographer ID" column in the event image DB 214. In addition, the photographing apparatus 10 stores the information of the photographer determined by the photographer recognition unit 112 in the photographer table 215b in the event situation DB 215.

In S35, the photographing apparatus 10 stores the photographing location information of the photographing opportunity for photographing the image detected by the photographing location detection unit 103 in the event image DB 214 and the event situation DB 215. The photographing apparatus 10 stores the photographing location information of the photographing opportunity for photographing the image detected by the photographing location detection unit 103 in the "Photographing Location" column in the event image DB 214. In addition, the photographing apparatus 10 stores the photographing location information of the photographing opportunity for photographing the image detected by the photographing location detection unit 103 in the photographing location table 215c in the event situation DB 215. It is noted that the process in S35 can be skipped for the event image DB 214 when the photographing location information is extracted from the attribute information such as the Exif information added to the image and stored in the event image DB 214 in S32.

Figure 5C:
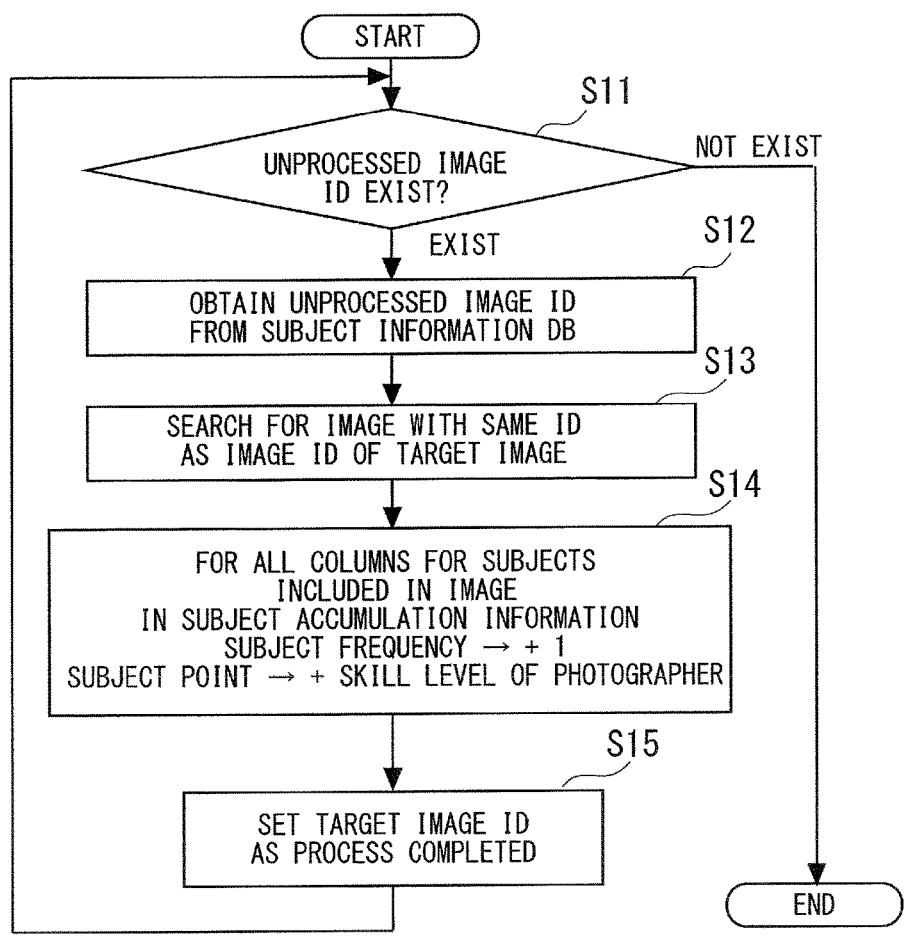
FIG. 5C is a diagram illustrating an example of a flowchart of a subject accumulating process.

The information processing apparatus 11 in the photographing assisting system 1 performs the subject accumulation processes illustrated in FIG. 5C after the information of the subject and the information of the photographer is stored in the event image DB 214 and the event situation DB 215 in S33 and S34.

(Subject Accumulation Processes)

FIG. 5C is an example of a flowchart of subject accumulation processes regarding the images photographed as stored image by the photographing apparatus 10. The information processing apparatus 11 in the photographing assisting system 1 according to the present embodiment performs the subject accumulation processes as illustrated in FIG. 5C to calculate the frequency of the appearance of the subject in the image photographed as stored image by the photographing apparatus 10. In addition, the information processing apparatus 11 performs the subject accumulation processes to calculate the subject point according to the photographing situation of the image. The subject point is a point obtained by weighting the subject in the image according to the skillfulness of the photographer of the image. When the subject accumulation processes in FIG. 5C are performed, the points in the "Subject Frequency" column and the "Subject Point" column in the subject accumulation information table 215a in FIG. 4E are updated.

FIG. 5D illustrates a diagram of a photographing situation of the image including a subject in an event. In the diagram, the information stored in the "Subject" column represents a participant of the event as a subject in an image and the information stored in the "Photographer" column represents a participant of the event who photographs an image. In addition, in the diagram, the information stored in the "Skill Level of Photographer" column represents the skillfulness of a participant of the event who photographs an image and the information stored in the "Number of Images" column represents the number of images photographed in the event. In the example in FIG. 5D, the participants of the event are "Administrator", "Wife", "Taro", "Hanako", "Friend A Male", "Friend B Male" and "Friend C Female". Regarding the relations between the participants, "Administrator" and "Wife" are a married couple and are parents of "Taro" and "Hanako". "Friend A Male", "Friend B Male" and "Friend C Female" are mutual friends of "Administrator" and "Wife". The skill levels of photographing of "Administrator" and "Friend B Male" are "A", the skill level of "Friend A Male" is "B" and the skill levels of "Wife" and "Friend C Female" are "C".

In the example in FIG. 5D, the number of images in which "Administrator" is a sole subject is 2 images photographed by "Wife". The number of images in which "Wife" is a sole subject is 5 images photographed by "Administrator". Since "Taro" accompanies "Administrator", the number of images in which "Taro" is a sole subject is 30 images photographed by "Administrator". In addition, since "Hanako" accompanies "Wife", the number of images in which "Hanako" is a sole subject is 22 images photographed by "Wife". Since "Fiend A Male" and "Friend B Male" move together, the number of images in which "Friend A Male" is a sole subject is 7 images photographed by "Friend B Male" and the number of images in which "Friend B Male" is a sole subject is 7 images photographed by "Friend A Male". Since "Friend C Female" moves alone, the number of images in which "Friend C Female" is a sole subject is 2 images photographed by "Friend B Male" who happens to pass by "Friend C Female".

Since "Administrator" takes a role of taking images "Taro" and "Hanako", the number of images in which "Taro" and "Hanako" are subjects is 5 images photographed by "Administrator". The number of images in which "Administrator", "Taro" and "Hanako" are subjects is 4 images photographed by "Wife". The number of images in which "Wife", "Taro" and "Hanako" are subjects is 2 images photographed by "Administrator". The number of images in which "Administrator", Wife", "Taro" and "Hanako" are subjects is 2 images photographed by "Friend A Male" who is asked to photograph "Administrator", Wife", "Taro" and "Hanako".

After "Taro" and "Hanako" were born, "Administrator" and "Wife" are not photographed together and "Administrator" and "Wife" are photographed with "Taro" and "Hanako". Therefore, the amounts of images in which "Administrator" and "Wife" are subjects, "Administrator" and "Taro" are subjects, "Administrator" and "Hanako" are subjects, "Wife" and "Taro" are subjects, "Wife" and "Hanako" are subjects, "Administrator", "Wife" and "Taro" are subjects or "Administrator", "Wife" and "Hanako" are subjects are 0 images.

The information processing apparatus 11 performs the subject accumulation processes to the images photographed in the situations as illustrated in FIG. 5D to calculate the values stored in the "Subject Frequency" column and the "Subject Point" column in the subject accumulation information table 215a in FIG. 4E.

In the flowchart illustrated in FIG. 5C, the subject accumulation processes are initiated when the process S34 in FIG. 5B are completed, for example. The information processing apparatus 11 detects by using an API etc. that the writing of subject information to the subject accumulation information table 215a is completed. When the information processing apparatus 11 detects that the writing of subject information to the subject accumulation information table 215a is completed, the information processing apparatus 11 performs the subject accumulation processes S11 to S15.

In the flowchart illustrated in FIG. 5C, the information processing apparatus 11 references to the subject information DB 213 to determine whether there is a record for which the subject accumulation processes are not completed (S11). For example, the information processing apparatus 11 determines whether there is a record for which "0" or "ZZZ" etc. indicating that the subject accumulation process is not completed is stored in the "Process Completed" column in the subject information DB 213. Alternatively, the information processing apparatus 11 determines whether there is a record for which the "Process Completed" column in the subject information DB 213 is empty.

When the information processing apparatus 11 determines that a record for which the "Process Completed" column in the subject information DB 213 is empty or "0" or "ZZZ" etc. indicating that the subject accumulation process is not completed is stored in the "Process Completed" column does not exist (S11: Not Exist), the information processing apparatus 11 terminates the subject accumulation processes. On the other hand, when the information processing apparatus 11 determines that a record for which the "Process Completed" column in the subject information DB 213 is empty or "0" or "ZZZ" etc. indicating that the subject accumulation process is not completed is stored in the "Process Completed" column exists (S11: Exist), the information processing apparatus 11 performs the processes S12 to S15.

The information processing apparatus 11 obtains an image ID which is stored in the "Image ID" column for the record for which the subject accumulation processes are not completed in S11 (S12). And the information processing apparatus 11 references to the subject information DB 213 to find a record in which the ID that is same as the image ID obtained in S12 is stored (S13).

The information processing apparatus 11 calculates a subject frequency and a subject point for the image ID obtained in S12 and S13 (S14). The calculations of the subject frequency and the subject point are performed for each image ID. The information processing apparatus 11 determines a subject ID for the image ID obtained in S12 and S13. In the example in FIG. 4D, the image for which the image ID is "1201" includes 3 subjects for which the subject IDs are "1", "2" and "4". Therefore, the information processing apparatus 11 determines that 3 subject for which the subject IDs are "1", "2" and "4" are included in the image corresponding to the image ID obtained in S12 and S13. And the information processing apparatus 11 counts up the number of images by "1" for the image ID which includes a set of subject IDs "1", "2" and "4".

The information processing apparatus 11 searches the "Subject ID" column in the subject accumulation information table 215a to determine a record in which the set of subjects IDs "1", "2 and "4" is stored. And the information processing apparatus 11 uses the count of the number of images to accumulate the number of images in the "subject Frequency" column in the record in which the subject IDs "1", "2" and "4" are stored in the "Subject ID" column. When the subject accumulation process is performed in the above case, "1" is accumulated to the value in the Subject Frequency" column in the record in which the subject IDs "1", "2" and "4" are stored in the "Subject ID" column in the subject accumulation information table 215a.

The information processing apparatus 11 uses the image ID obtained in S12 and S13 to search the event image DB 214 for a photographer ID corresponding to the image ID and obtain the photographer ID. The information processing apparatus 11 uses the photographer ID to search the photographer information DB 216 for a skill level corresponding to the photographer ID and obtain the skill level.

The information processing apparatus 11 determines a subject point according to the obtained skill level. For example, when the skill level has three levels "A", "B" and "C", a weighting can be applied so that "3" points are given to the skill level "A", "2" points are given to the skill level "B" and "1" point is given to the skill level "C".

The information processing apparatus 11 adds the determined points according to the skill level corresponding to the photographer ID to the "Subject Point" column in the record in which the subject IDs "1", "2" and "4" are stored in the Subject ID" column. For example, when the skill level corresponding to the photographer ID is "A", "3" points are added to the value in the "Subject Point" column in the record in which the subject IDs "1", "2" and "4" are stored in the Subject ID" column. "2" points are added to the value in the "Subject Point" column when the skill level is "B" and "1" point is added to the value in the "Subject Point" column when the skill level is "C" in the same manner.

In S15, the information processing apparatus 11 completes the subject accumulation processes for the image ID processed in S12 to S14. The information processing apparatus 11 references to the subject information DB 213 to store "1" indicating that the subject accumulation processes is completed in the "Process Completed" column in the record corresponding to the image ID processes in S12 to S14. And the information processing apparatus 11 repeats the processes S11 to S15 and completes the subject accumulation processes for each image photographed in the event. When the processes S11 to S15 are performed, the calculation of the subject frequency and the subject point in the subject accumulation information table 215a is completed for each image.

For example, the results of the subject accumulation processes for the images in FIG. 5D are stored in the "Subject Frequency" column and the "Subject Point" column for each record in the subject accumulation information table 215a in FIG. 4E.

In the example in FIG. 5D, the number of images in which "Administrator" is a sole subject is "2" images photographed by "Wife" with the skill level "C". The subject ID for "Administrator" is "1". As a result of the subject accumulation processes in FIG. 5C, the information processing apparatus 11 accumulates the number of images in which "Administrator" is a sole subject in the "Subject Frequency" column. In addition, the information processing apparatus 11 multiplies the point corresponding to the skill level "C" and the number of images photographed by "Wife" in which "Administrator" is a sole subject and accumulates the multiplied value in the "Subject Point" column. The accumulated values are stored in the subject accumulation information table 215a.

In the subject accumulation information table 215a in FIG. 4E, the number of images "2" in the "Subject Frequency" column in the record corresponding to the subject ID "1". In addition, a point value "2" corresponding to the skill level of the photographer is stored in the "Subject Point" column in the record corresponding to the subject ID "1".

Further, in the example in FIG. 5D, the number of images in which "Administrator", "Wife", "Taro" and "Hanako" are subjects is "2" images photographed by "Friend A Male" with the skill level "B". The subject ID for "Administrator" is "1", the subject ID for "Wife" is "2", the subject ID for "Taro" is "3" and the subject ID for "Hanako" is "4".

The information processing apparatus 11 performs the subject accumulation processes to accumulate the number of images in which "Administrator", "Wife", "Taro" and "Hanako" are subjects in the "Subject Frequency" column. In addition, the information processing apparatus 11 multiplies the point corresponding to the skill level "B" and the number of images in which "Administrator", "Wife", "Taro" and "Hanako" are subjects and accumulates the multiplied value in the "Subject Point" column. In the subject accumulation information table 215a in FIG. 4E, the accumulated number of images "2" is stored in the "Subject Frequency" column in the record in which the subject ID is "1, 2, 3, 4". In addition, the accumulated point "4" corresponding to the skill level of the photographer is stored in the "Subject Point" column.

(Photographing Advice Processes)

The photographing advice processes in S2 in FIG. 5A are described with reference to FIG. 6A. In the photographing assisting system 1 according to the present embodiment, the photographing advice processes are performed by the information processing apparatus 11 and the photographing apparatus 10. In the photographing advice processes in FIG. 6A, the information processing apparatus 11 determines the photographing situation based on the images transmitted from the photographing apparatus 10 and transmits the change possibility information according to the photographing situation to the photographing apparatus 10. The photographing apparatus 10 receives the change possibility information from the information processing apparatus 11 and displays photographing advice according to the change possibility information on the display device such as the monitor. The photographing advice information according to the photographing situation is provided via the display device of each photographing apparatus 10.

Figure 6A:
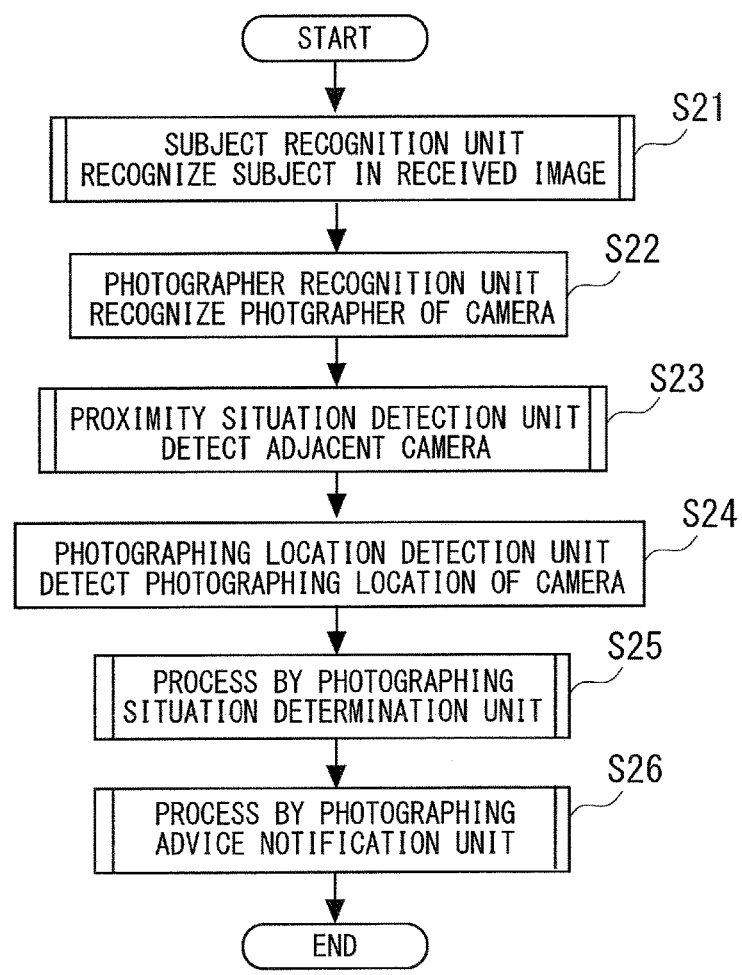
FIG. 6A is a diagram illustrating an example of a flowchart of a photographing assisting process in S2 in FIG. 5A.

The processes in S21 in the flowchart in FIG. 6A are described with reference to FIGS. 6B to 6D. In addition, the processes in S23 are described with reference to FIGS. 6E and 6F. The processes in S25 are described with reference to FIGS. 6G to 6I. The processes in S26 are described with reference to FIGS. 6J to 6N.

In the flowchart in FIG. 6A, the photographing advice processes are initiated when the information processing apparatus 11 receives an image from the photographing apparatus 10 via the network N, for example. The information processing apparatus in the photographing assisting system 1 performs the subject recognition processes to the received image to recognize a subject in the image (S21).

In addition, the information processing apparatus 11 recognizes the user (photographer) of the photographing apparatus 10 which transmits the image (S22). The information processing apparatus 11 obtains the address information used for the communication performed by the photographing apparatus 10 and associates the obtained address information and the user of the photographing apparatus 10 to determine the photographer of the received image.

In the flowchart in FIG. 6A, the photographing apparatus 10 in the photographing assisting system 1 detects photographing apparatuses within an adjacent area of the photographing apparatus 10 (S23). Further, the photographing apparatus 10 detects the location of the photographing apparatus 10 which is photographing the image (S24).

For example, the photographing apparatus 10 uses the GPS function to detect the longitude and latitude of the photographing apparatus 10 as the location information. The photographing apparatus 10 temporarily stores the photographing apparatus information and the photographing location information obtained in S22 and S23 in a predetermined area in the main memory 92. And the photographing apparatus 10 transmits the photographing apparatus information and the photographing location information obtained in S22 and S23 to the information processing apparatus 11 via the network N. The processes in S21 and S22 performed by the information processing apparatus 11 and the processes in S23 and S24 performed by the photographing apparatus 10 can be processed in parallel.

In S25, the information processing apparatus 11 determines the photographing situation of the image based on the subject information and the photographer information obtained in S21 and S22 and the photographing apparatus information and the photographing location information transmitted from the photographing apparatus 10. The information processing apparatus 11 generates change possibility information of the photographer of the image and the generated information to the photographing apparatus 10.

In S26, the photographing apparatus 10 determines photographing advice information according to the photographing situation based on the change possibility information of the photographer of the image transmitted from the information processing apparatus 11. The photographing apparatus 10 references to the photographing advice DB 217 to determine the photographing advice information based on the change possibility information of the photographer, the subject and the photographing location transmitted from the information processing apparatus 11.

The photographing advice information determined in S26 is displayed on the display device such as an EL panel which is the output unit 95 of the photographing apparatus 10. The photographing apparatus 10 display the photographing advice information with the image overlapped thereon. The photographing advice information determined in S26 is provided for the user via the monitor etc. of the photographing apparatus 10.

Since the photographing assisting system 1 according to the present embodiment performs the photographing processes in FIG. 5A after the photographing advice processes in FIG. 6A is terminated, the photographing assisting system 1 can provide photographing advice information according to the photographing situation for the photographer who is photographing the image. The photographing advice information can be displayed to overlap the image on the monitor of the photographing apparatus 10. The user of the photographing apparatus 10 can check the photographing advice information on the monitor etc. before the photographing processes of the image are completed. The user of the photographing apparatus 10 uses to the photographing advice information display on the monitor etc. to encourage the mutual communication among the users as described below.

For example, the user of a photographing apparatus 10 can use the photographing advice information to encourage the photographer using the other photographing apparatus 10 to join in the photographing image as a subject.

In addition, the users of the other photographing apparatuses can use the photographing advice information to ask a photographer of one of the other photographing apparatuses 10 to photograph an image on the scene. Further, the users of the other photographing apparatuses can use the photographing advice information to ask a photographer of one of the other photographing apparatuses 10 to photograph the users themselves as subjects.

In the photographing assisting system 1 according to the present embodiment, since the uses can use the photograph-ing advice information to encourage the mutual communications among the users, the mutual exchanges among the users can be enhanced. In addition, when such mutual exchanges are enhanced, opportunities of photographing the users with each other can be increased to adjust the unevenness of the opportunities.

(Subject Recognition Processes)

The processes in S21 in FIG. 6A are described with reference to the flowchart in FIG. 6B. In the photographing assisting system 1 according to the present embodiment, the processes in S21 are performed as subject recognition processes by the information processing apparatus 11. The information processing apparatus 11 performs the processes in the flowchart for the subject recognition processes in FIG. 6B based on the image transmitted from the photographing apparatus 10.

Figure 6B:
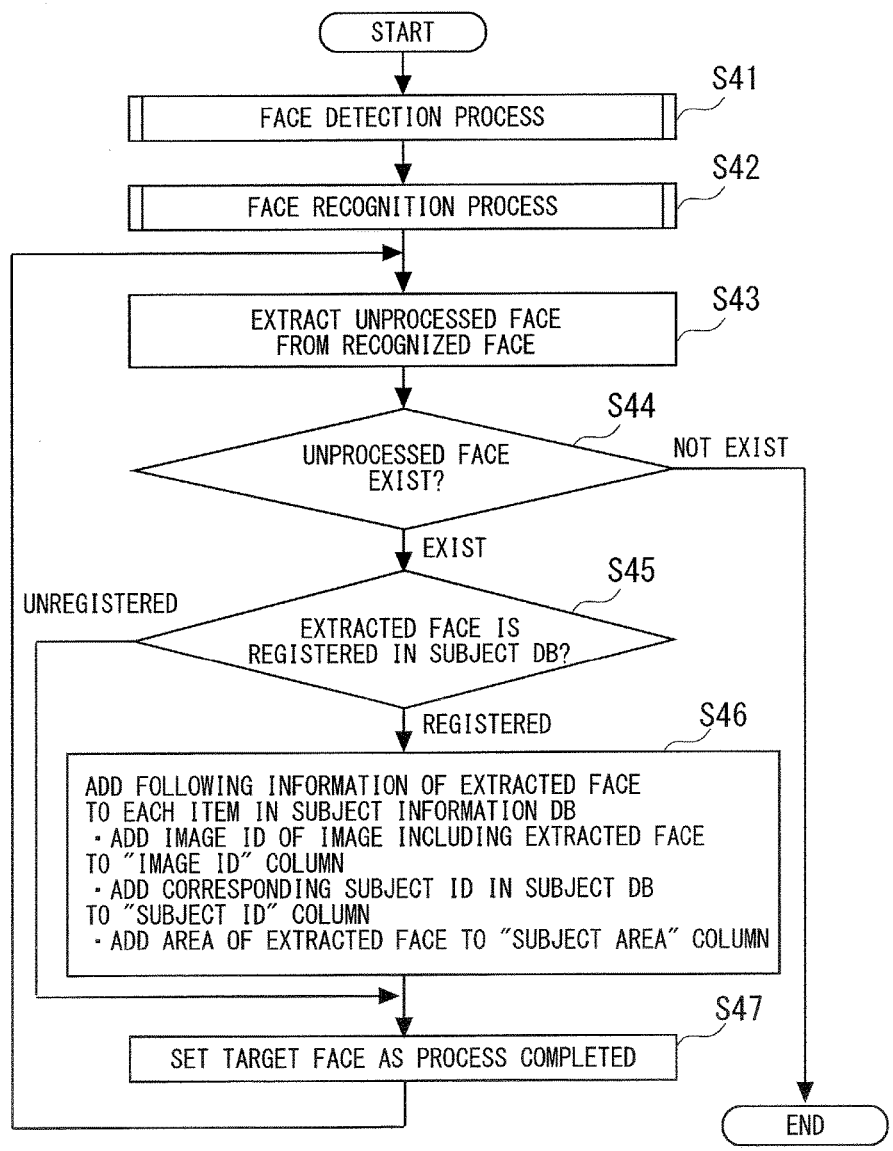
FIG. 6B is a diagram illustrating an example of a flowchart of a subject recognition process in S21 in FIG. 6A.

In the flowchart in FIG. 6B, the information processing apparatus 11 performs the face detection process for the image received from the photographing apparatus 10 (S41) and performs the face recognition process (S42). The face detection process in S41 is described with reference to FIG. 6C. And the face recognition process in S42 is described with referenced to FIG. 6D.

The information processing apparatus 11 uses the information of the face of the subject obtained in S41 and S42 to extract the information of the face which has not been processed by the information processing apparatus 11 (S43). The information processing apparatus 11 determine whether the information of the face which has not been processed exists (S44) and terminates the subject recognition processes when the information processing apparatus 11 determines the information of the face does not exist ("Not Exist" in S44). On the other hand, the information processing apparatus 11 determines whether the information of the face extracted in S43 is registered in the subject DB 212 (S45) when the information of the face exists ("Exist" in S44).

When the information processing apparatus 11 determines that the information of the face extracted in S43 is registered in the subject DB 212 ("Registered" in S45), the process proceeds to S46. On the other hand, when the information processing apparatus 11 determines that the information of the face extracted in S43 is not registered in the subject DB 212 ("Not Registered" in S45), the process proceeds to S47 with S46 skipped.

In S46, the information processing apparatus 11 adds the record of the information of the face extracted in S43 to the subject information DB 213. For example, the information processing apparatus 11 adds the image ID of the image including the information of the face extracted in S43 to the "Image ID" column and adds the subject ID corresponding to the face to the "Subject ID" column. In addition, the information processing apparatus 11 adds the area of the face of the subject in the image to the "Subject Area" column.

When the process proceeds to S47, the information processing apparatus 11 determines that the subject recognition processes regarding the face extracted in S43 are completed and repeats the subject recognition processes as described above regarding the remaining subjects in the image. For example, the information processing apparatus 11 repeats the processes S41 to S47 until a face to which the subject recognition processes are not performed does not exist in the image.

(Face Detection Processes)

Next, the face detection processes in S41 in FIG. 6B are described with reference to the flowchart in FIG. 6C. The face detection processes in FIG. 6C are processes for detecting a face by pattern matching using template data representing facial characteristics such as an eye, a nose and a mouth etc. The information processing apparatus 11 detects a face based on the degree of matching between the image and the template data.

It is noted that the images which are being photographed may be images such as landscape which are not subject to the face detection processes. When the images are images such as landscape which are not subject to the face detection processes, the information processing apparatus 11 adds information indicating that the face detection processes cannot be performed to the image and terminates the subject recognition processes in FIG. 4B. The information processing apparatus 11 notifies the photographing situation determination processes in S25 in FIG. 6A that the subject recognition processes determines that the image does not include a subject.

In the flowchart in FIG. 6C, the information processing apparatus 11 extracts an image to which the face detection processes have not been performed from the images received from the photographing apparatus 10 (S51). And the information processing apparatus 11 determines whether an image as a target of the face detection processes exists (S52). The information processing apparatus 11 terminates the face detection processes when an image as a target of the face detection processes does not exist ("Not Exist" in S52). On the other hand, the information processing apparatus 11 performs the processes S53 to S59 to the image extracted in S51 when the information processing apparatus 11 determines that an image to which the face detection processes have not been performed exists ("Exist" in S52).

In S53, the information processing apparatus 11 references to the template data stored in the auxiliary memory 93 etc. to obtain template data with the minimum size among the template data representing an eye, a nose and a mouth etc. The sizes of the template data vary. The obtained template data with the minimum size is temporarily stored in a predetermine area in the main memory 92.

In S54, the information processing apparatus 11 perform pattern matching scan using the template data obtained in S53 to the received image processed in S51 and calculates the degree of matching. When the information processing apparatus 11 calculates the degree of matching, the information processing apparatus 11 shifts the target area for the pattern matching in the received image in the horizontal direction. When the information processing apparatus 11 shifts the target area to reach an edge of the received image, the information processing apparatus 11 shifts the target area in the vertical direction and repeats the processes for calculating the degree of matching. The information processing apparatus 11 performs the scan to the received image in this manner. The calculated degree of matching is temporarily stored in a predetermined area in the main memory 92 along with the area information including the coordinates of the area as the target of the pattern matching.

In S55, the information processing apparatus 11 compares the degree of matching calculated in S53 with a threshold for determining whether the target area corresponds to an area including a face and determines whether an area for which the degree of matching is above the threshold exists. When the information processing apparatus 11 determines that an area for which the degree of matching is above the threshold exists ("Exist" in S55), the process proceeds to S56. On the other hand, when the information processing apparatus 11 determines that an area for which the degree of matching is above the threshold does not exist ("Not Exist" in S55), the process proceeds to S57 with S56 skipped.

In S56, the information processing apparatus 11 temporarily stores the area as face area information for which it is determined in S53 the degree of matching is above the threshold in a predetermined area in the main memory 92. When an area for which it is determined in S53 the degree of matching is above the threshold overlaps another area for which it is determined in S53 the degree of matching is above the threshold, the information processing apparatus 11 stores the area as the face area information for which the degree of matching is higher than the degree of matching for the other area. In addition, when an area for which it is determined in S53 the degree of matching is above the threshold does not overlap another area for which it is determined in S53 the degree of matching is above the threshold, the information processing apparatus 11 stores the both areas as the face area information.

In S57, the information processing apparatus 11 references to the template data stored in the auxiliary memory 93 etc. to obtain template data the size of which is one size up from the size obtained in S53. The information processing apparatus 11 temporarily stores the obtained template data in a predetermined area in the main memory 92.

In S58, the information processing apparatus 11 determines whether the size of the template data obtained in S57 is equal to or larger than the maximum size. When the size of the template data obtained in S57 is smaller than the maximum size ("No" in S58), the process proceeds to S54 and the information processing apparatus 11 repeats the processes S54 to S58.

On the other hand, when the size of the template data obtained in S57 is equal to or larger than the maximum size ("Yes" in S58), the information processing apparatus 11 determines that the processes for the received image extracted in S51 are completed (S59), the process proceeds to S51 and the information processing apparatus 11 repeats the processes S51 to S59. The information processing apparatus 11 repeats the processes S51 to S59 until an area of a face for which the above processes have not been performed does not exist in the received image.

(Face Recognition Process)

Next, the face recognition processes in S42 in FIG. 6B are described with reference to the flowchart in FIG. 6D. The face recognition processes are performed by using the degree of similarity between the face area detected in S41 in FIG. 6B and the face area registered in the subject information DB.

Figure 6D:
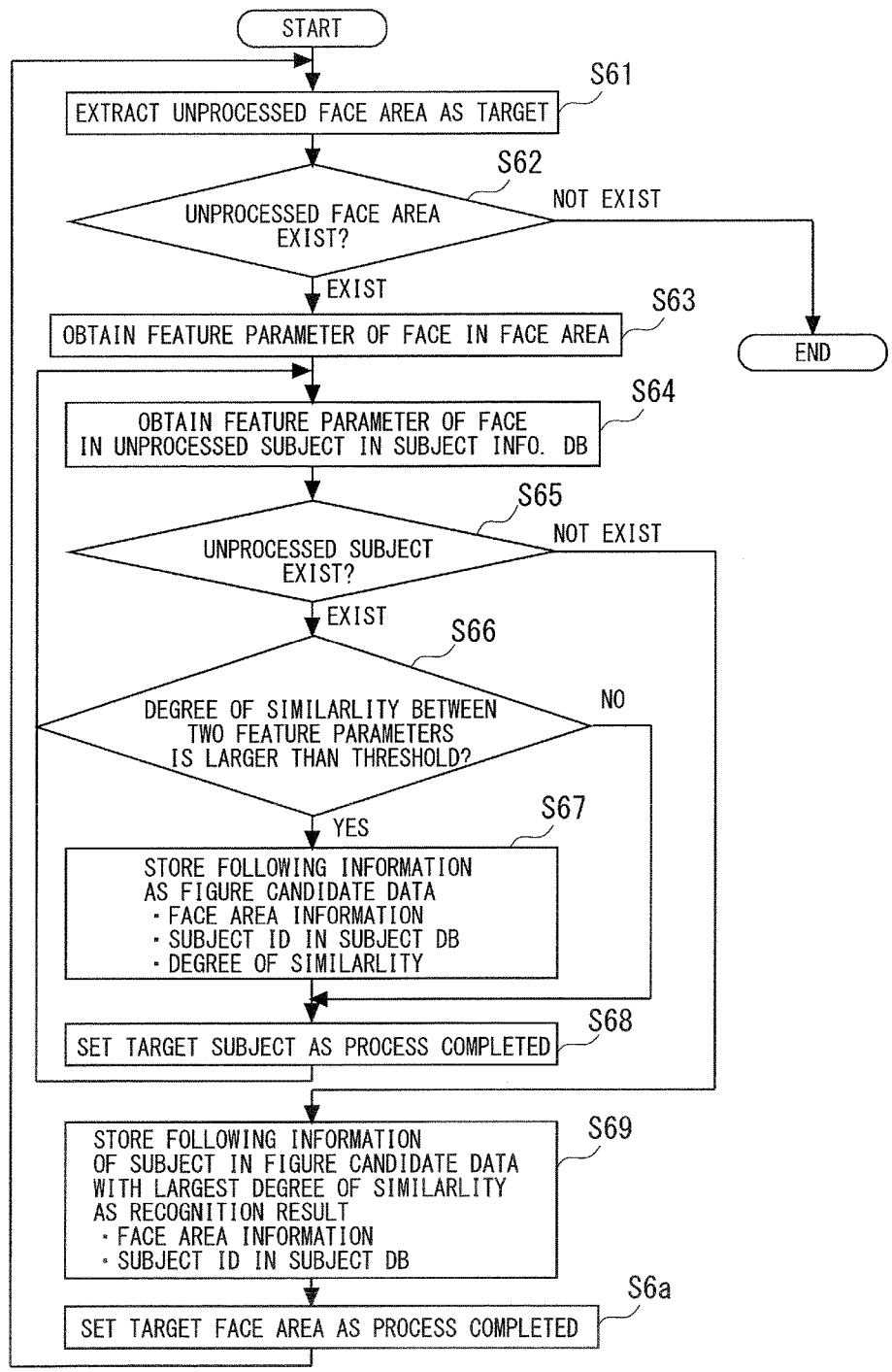
FIG. 6D is a diagram illustrating an example of a flowchart of a face recognition process in S42 in FIG. 6B.

In the flowchart in FIG. 6D, the information processing apparatus 11 extracts a face area for which the face recognition processes have not been performed based on the face area detected in S41 in FIG. 6B (S61). The information processing apparatus 11 determines whether a face area for which the face recognition processes have not been performed exists (S62). When the information processing apparatus 11 determines that a face area for which the face recognition processes have not been performed does not exist ("Not Exist" in S62), the information processing apparatus 11 terminates the face recognition processes. On the other hand, when the information processing apparatus 11 determines that a face area for which the face recognition processes have not been performed exists ("Exist" in S62), the information processing apparatus 11 performs the processes S63 to 69 and S6a to the face area extracted in S61.

In S63, the information processing apparatus 11 obtains feature parameters of the face in the face area extracted in S61. It is noted here that the feature parameters are vector data in which the positions of an eye, a nose and a mouth etc. in the face area are parameterized. The information processing apparatus 11 temporarily stores the obtained feature parameters in a predetermined area in the main memory 92.

In S64, the information processing apparatus 11 references to the subject DB 212 and the subject information DB 213 to obtain the feature parameters of the face in the face area for which the face recognition processes have not been performed. The information processing apparatus 11 references to the subject DB 212 and the subject information DB 213 to associate the obtained feature parameters with a subject ID and stored the obtained feature parameters and the subject ID in a predetermined area in the main memory 92.

The information processing apparatus 11 determines whether a subject for which the face recognition processes have not been performed exists in the subject DB 212 etc. (S65). When a subject for which the face recognition processes have not been performed does not exist in the subject DB 212 etc. ("Not Exist" in S65), the process proceeds to S69. On the other hand, when a subject for which the face recognition processes have not been performed exists in the subject DB 212 etc. ("Exist" in S65), the process proceeds to S66.

In S66, the information processing apparatus 11 calculates the degree of similarity between the feature parameters obtained in S63 and the feature parameters obtained in S64. It is noted that the degree of similarity can be calculated based on the difference between the feature parameters obtained in S63 and the feature parameters obtained in S64. For example, the degree of similarity can be calculated by calculating the distance based on the difference between the vector data of the positions of an eye, a nose and a mouth etc. in the face area. The information processing apparatus 11 determines that the degree of similarity is "1" when the calculated distance is "0".

The information processing apparatus 11 compares the calculated degree of similarity between the feature parameters with a threshold to determine the magnitude relation between the degree of similarity and the threshold. When the degree of similarity is equal to or larger than the threshold ("Yes" in S66), the process proceeds to S67. On the other hand, when the degree of similarity is smaller than the threshold ("No" in S66), the process proceeds to S68 with S67 skipped.

In S67, the information processing apparatus 11 stores the face area extracted in S61 and the subject ID obtained in S64 and the degree of similarity calculated in S66 regarding the subject for which it is determined in S66 that the degree of similarity is equal to or larger than the threshold as figure candidate data. The information processing apparatus 11 temporarily stores the figure candidate data in a predetermined area in the main memory 92.

In S68, the information processing apparatus 11 determines that the face detection processes have been performed to the subject ID obtained in S64 (S68). The process proceeds to S64 and the information processing apparatus 11 repeats the processes S64 to S68. The information processing apparatus 11 repeats the processes S64 to S68 until a face area to which the face detection processes have not been performed does not exist in the subject DB 212 etc.

In S69, the information processing apparatus 11 references to the figure candidate data stored in S67 and generates the face information list as a result of the face recognition result of the subject which includes the face area extracted in S61 and stores the generated face information list in a predetermined area in the main memory 92. The face information list includes the face area information extracted in S61 and the subject ID obtained in S64. When the figure candidate data is not generated in S67, the information processing apparatus 11 stores in the face information list information indicating that a subject as a target of the face recognition processes does not exist. In addition, when only one piece of figure candidate data exists, the information processing apparatus 11 stores the generated figure data in the face information list. In addition, when plural pieces of figure candidate data exist, the information processing apparatus 11 stores the information including the subject with the highest degree of similarity as the face information list.

In S6a, the information processing apparatus 11 determines that the face recognition processes have been performed to the face area extracted in S61. The process proceeds to S61 and the information processing apparatus 11 repeats the processes S61 to S6a. The information processing apparatus 11 repeats the processes S61 to S6a until a face area to which the face detection processes have not been performed does not exist in the face area detected by the face detection processes.

(Proximity Situation Detection Processes)

Next, the proximity situation detection processes are described with reference to the flowchart in FIG. 6E. The proximity situation detection processes are performed based on the location obtained by a GPS function etc. of the photographing apparatus 10.

Figure 6E:
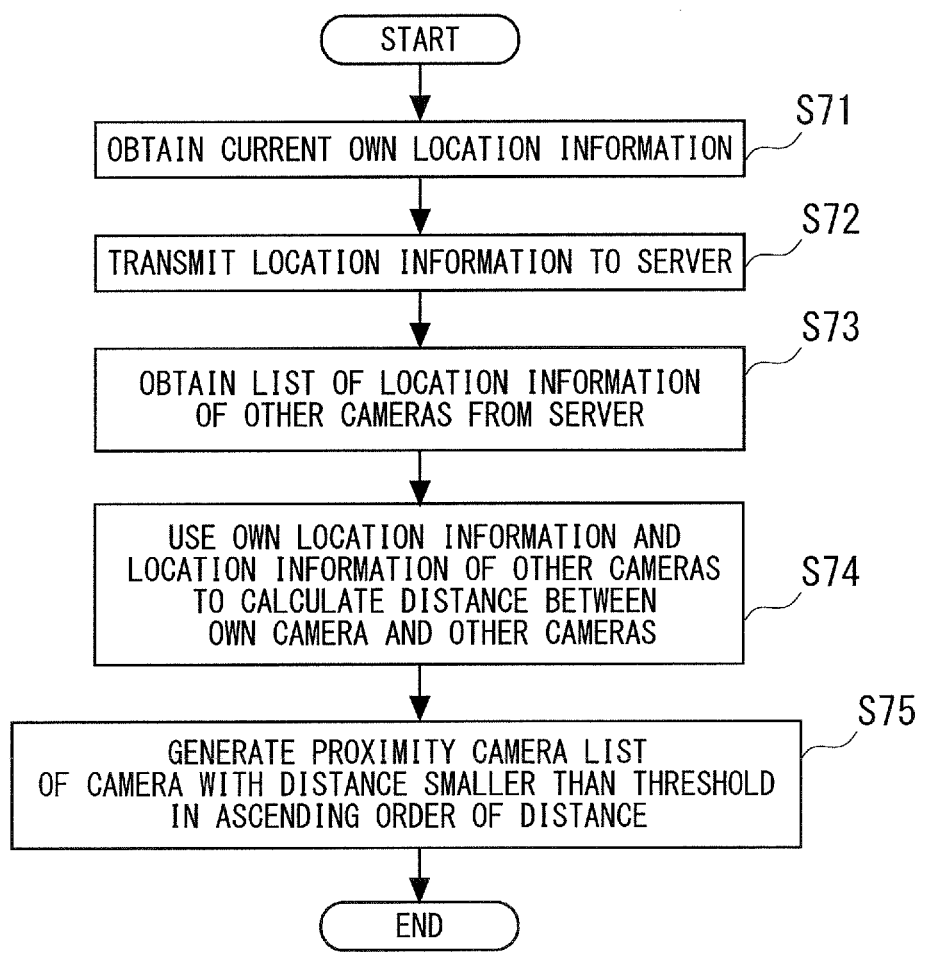
FIG. 6E is a diagram illustrating an example of a flowchart of a proximity situation detection process in S23 in FIG. 6A.

In the flowchart in FIG. 6E, the photographing apparatus 10 uses, for example, the GPS function during the photographing the image of the subject to obtain the location (S71). The photographing apparatus 10 transmits the obtained location to the information processing apparatus 11 (S72). The information processing apparatus 11 transmits a list which the location obtained from the other photographing apparatuses 10 connected with the photographing assisting system 1 to the photographing apparatus 10. The location of each photographing apparatus can be represented by a coordinate such as the longitude and latitude. In addition, the list includes the photographer IDs associated with the other photographing apparatuses and the names of the photographers. The photographing apparatus 10 obtains the list transmitted from the information processing apparatus 11 via the network N (S73).

The photographing apparatus 10 calculates a value of the distance between the photographing apparatus 10 and the other photographing apparatuses based on the location of the other photographing apparatuses in the list obtained in S73 (S74). The photographing apparatus 10 compares the calculated distance with the threshold and generates a list of the photographing apparatuses (proximity apparatus list) for which the calculated distance is equal to or smaller than the threshold and in which the photographing apparatuses are arranged in ascending order of the distance (S74). The photographing apparatus 10 stores the generated list in a predetermined area in the main memory 92.

Figure 6F:
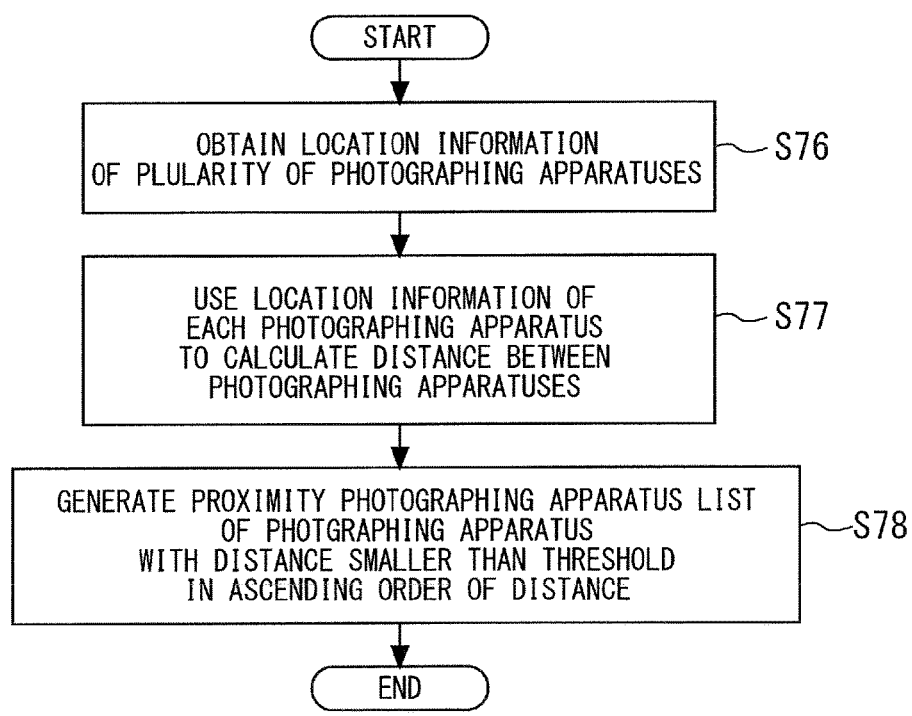
FIG. 6F is a diagram illustrating an example of a flowchart of a proximity situation detection process in S23 in FIG. 6A.

The photographing apparatus list can be generated by the information processing apparatus which receives the location of the photographing apparatus 10. FIG. 6F illustrates the flowchart of the proximity situation detection processes performed by the information processing apparatus 11.

In the flowchart in FIG. 6F, the information processing apparatus 10 obtains the locations of the plurality of photographing apparatuses connected with the network N (S76). The information processing apparatus 10 calculates the distances between the photographing apparatus 10 and the other photographing apparatuses based on the locations of the other photographing apparatuses obtained in S76 (S77). The information processing apparatus 11 compares the calculated distances with the threshold and generates the photographing apparatus list in which the photographing apparatuses are arranged in the ascending order of the distances (S78). The information processing apparatus 11 transmits the generated photographing apparatus list to the photographing apparatus 10.

(Photographing Situation Determination Processes)

Figure 6G:
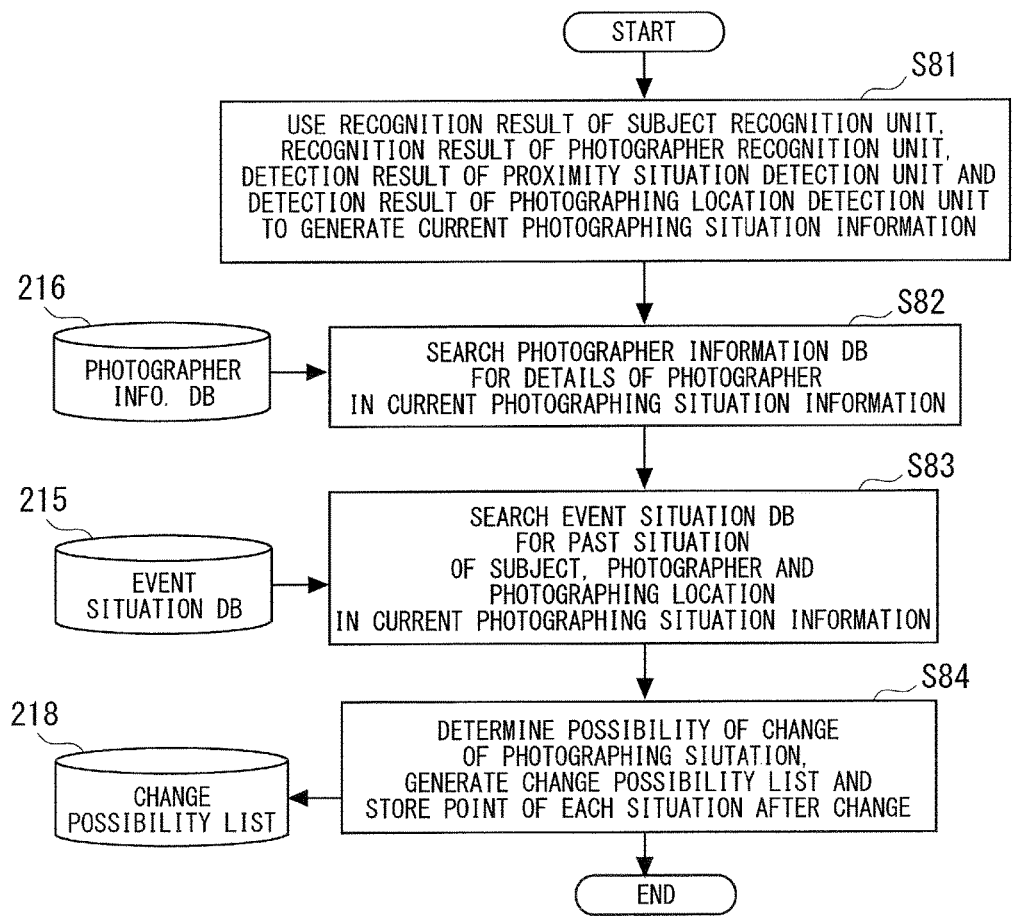
FIG. 6G is a diagram illustrating an example of a flowchart of a photographing situation detection process in S25 in FIG. 6A.

The photographing situation determination processes are described in S25 in FIG. 6A are described below with reference to the flowchart in FIG. 6G. The photographing situation determination processes in FIG. 6G are performed by the information processing apparatus 11 in the photographing assisting system 1. In the photographing situation determination processes in FIG. 6G, the information processing apparatus 11 determines the photographing situation in which the image is being photographed in the event based on the results of the processes in S21 to S24 in FIG. 6A and generates the change possibility information of the photographer according to the determined photographing situation. The information processing apparatus 11 transmits a notification of the completion of the generation of the change possibility information to the photographing apparatus which photographs the image via the network N.

In S81 in the flowchart in FIG. 6G, the information processing apparatus 11 obtains the information of the subject in the image recognized in the subject recognition processes in S21 in FIG. 6A and the information of the photographer of the image recognized in S22. In addition, the information processing apparatus 11 obtains the list of the other photographing apparatuses within the proximity area of the photographing apparatus 10 which is photographing the image detected in S23 in FIG. 6A and the location of the photographing apparatus 10 detected in S24. The information processing apparatus 11 generates photographing situation information according to the various obtained information. The generated photographing situation information is temporarily stored in a predetermined area in the main memory 92.

FIG. 6H illustrates an example of the list of the photographing situation information (also referred to as photographing situation information list). The photographing situation information list illustrated in FIG. 6HA is for the administrator the subject ID of which is 1. The photographing situation information list illustrated in FIG. 6HB is for the female friend C the subject ID of which is 13. It is assumed here that the administrator and the female friend C are close to each other and individually photographing their own images.

The photographing situation information lists in FIGS. 6HA and 6HB include a "Photographer" column, a "Subject" column, a "Photographing Location" column and a "Proximity Terminal Information" column. The "Photographer" column stores the photographer ID of the photographer which is photographing the image recognized in S22. The "Subject" column stores the subject ID(s) of the subject(s) in the image recognized in S21. For example, "None" etc. is stored in the "Subject" column when it is determined in S21 that the image does not include a subject. The "Photographing Location" column stores the location of the photographing apparatus 10 which is photographing the image detected in S24. The "Proximity Terminal Information" column stores the photographer ID(s) of the photographer(s) corresponding to the other photographing apparatus(es) detected in S23.

In the example in FIG. 6HA, "None" etc. indicating that the image does not include a subject is stored in the "Subject" column in the record for which "ID=1" is stored in the "Photographer" column. In addition, the longitude and latitude information such as "Northern Latitude x1" and "East Longitude y1" and the information obtained from the electronic compass function such as "Direction z2" are stored in the "Photographing Location" column. The photographer ID such as "ID=13" is stored in the "Proximity Terminal Information" column.

In addition, in the example in FIG. 6HB, "None" etc. indicating that the image does not include a subject is stored in the "Subject" column in the record for which "ID=13" is stored in the "Photographer" column. In addition, the longitude and latitude information such as "Northern Latitude x2" and "East Longitude y2" and the information obtained from the electronic compass function such as "Direction z2" are stored in the "Photographing Location" column. The photographer ID such as "ID=1" is stored in the "Proximity Terminal Information" column.

It can be concluded in FIGS. 6HA and 6HB that the photographers for which the photographer IDs are 1 or 13 are close to each other and are individually photographing their own images.

The information processing apparatus 11 performs the processes in S81 to generate a photographing situation information list as exemplified in FIGS. 6HA and 6HB.

Referring back to FIG. 6G, the information processing apparatus 11 refers to the photographer information DB 216 in S82 to obtain the photographer information of the photographers stored in the photographing situation information list generated in S81. The information processing apparatus 11 obtains the photographer information corresponding to the photographer IDs stored in the "Photographer" column in the photographing situation information list from the photographer information DB 216. In addition the information processing apparatus 11 obtains the photographer information corresponding to the photographer IDs stored in the "Proximity Terminal Information" column in the photographing situation information list from the photographer information DB 216. The information processing apparatus 11 temporarily stores the photographer information corresponding to each photographer ID obtained from the photographer information DB 216 in a predetermined area in the main memory 92.

In S83, the information processing apparatus 11 searches the event situation DB 215 for the information stored in the "Subject" column, the "Photographer" column and the "Photographing Location" column in the photographing situation information list generated in S81. For example, the information processing apparatus 11 searches the photographer table 215a in the event situation DB 215 by using the photographer IDs stored in the "Photographer" column. In addition, the information processing apparatus 11 searches the photographing location table 215c in the event situation DB 215 by using the longitude and latitude stored in the "Photographing Location" column.

The information processing apparatus 11 determines the subject accumulation information table 215a corresponding to the information stored in the "Subject" column and the "Photographing Location" column. The information processing apparatus 11 searches the determined subject accumulation information table 215a for the subject ID stored in the "Subject" column in the photographing situation information list. And the information processing apparatus 11 obtains information indicating the past photographing situation such as the subject frequency and the subject point corresponding to the subject ID. The information processing apparatus 11 temporarily stores the obtained information indicating the past photographing situation such as the subject frequency and the subject point corresponding to the subject ID in a predetermined area in the main memory 92.

In S84, the information processing apparatus 11 determines the possibility of the change of the photographing situation based on the photographer information and the information indicating the past photographing situation such as the subject frequency and the subject point corresponding to the subject ID obtained in S82 and S83. The information processing apparatus 11 generates the change possibility list 218 as illustrated in FIG. 6I as the result of the determination of the possibility of the change of the photographing situation. The change possibility list 218 is a list in which the possibility of the change of a subject and a photographer and the point information for determining the advantages and disadvantages of the change. The information processing apparatus 11 temporarily stores the generated change possibility list 218 in a predetermined area in the main memory 92.

The processes S81 to S83 performed by the information processing apparatus 11 are an example of a step for receiving images from the plurality of photographing apparatuses, recognizing a subject in each received image and a location in which each received image is photographed, determining a group including at least one photographing apparatus within a predetermined area of each photographing apparatus, detecting a photographing situation indicating the subject, the location and a photographer of the photographing apparatus within the predetermined area. In addition, the CPU 91 etc. of the information processing apparatus 11 performs the processes S81 to S83 as an example of processes for recognizing subjects and photographing locations based on images received from a plurality of photographing apparatuses, determining groups of photographing apparatuses within a predetermined area of the photographing locations and detecting photographing situations including photographers associated with the photographing apparatuses within the predetermined area.

In addition, the process S84 performed by the information processing apparatus 11 is an example of a step for outputting photographing advice according to the photographing situation of each of the plurality of photographing apparatuses to the photographing apparatus in the group. In addition, the CPU 91 etc. of the information processing apparatus 11 performs the process S84 as an example of processes for outputting photographing advice according to the photographing situations of the plurality of photographing apparatuses from the photographing locations to the groups within the predetermined area.

FIG. 6I illustrates an example of the change possibility list generated in S84. For example, the change possibility list 218 in FIG. 6IA is a list for the administrator the subject ID of which is 1 and the change possibility list 218 in FIG. 6IB is a list for the female friend C the subject ID of which is 13. In S84, the change possibility list is generated for each photographing apparatus which is photographing an image.

The change possibility list 218 in FIGS. 6IA and 6IB includes a "List ID" column, a "Photographer" column, a "Photographer Change Flag" column, a "Subject" column, a "Subject Change Flag", a "Photographing Location" column, a "Photographing Location Change Flag" column and a "Point" column.

The "List ID" column stores identification information (list ID) for uniquely identifying the changed photographing situations. Various information indicating the photographing situation is stored in the record in which "1" is stored in the "List ID" column. The "Photographer" column stores the photographer ID of the photographer who is photographing an image and the photographer ID of the changed photographer. It is noted that the changed photographer ID is a photographer ID corresponding to another photographing apparatus stored in the "Proximity Terminal Information column in the photographing situation information list generated in S82.

The "Photographer Change Flag" column stores flag information indicating whether there is a change of the photographer who is photographing an image. The flag information stored in the "Photographer Change Flag" column is binary information such as "0" and "1". For example, a flag "0" is stored in the "Photographer Change Flag" column when there is not a change of a photographer and a flag "1" is stored in the "Photographer Change Flag" column when there is a change of a photographer.

The "Subject" column stores subject IDs. The subject ID stored in the "Subject" column includes a subject ID corresponding a photographer ID. The "Subject Change Flag" column stores flag information indicating whether a change of a subject in an image. For example, a flag "0" is stored in the "Subject Change Flag" column when there is not a change of a subject and a flag "1" is stored in the "Subject Change Flag" column when there is a change of a subject. When a subject is not included in an image and a subject becomes a part of the image, "2" is stored in the "Subject Change Flag" information since the subject is newly added to the image.

The "Photographing Location" column stores information of locations etc. in which images are being photographed. Information of the photographing direction obtained from an electronic compass etc. can be stored in the "Photographing Location" column. As for the photographing direction information, the true north direction is represented by "0" and the other directions can be represented by relative angles to the true north direction ranging from 0 to 360 degrees in a clockwise manner. The "Photographing Location Change Flag" column stores flag information indicating whether there is a change of a photographing location in which an image is being photographed. The flag information stored in the "Photographing Location Change Flag" column is binary information such as "0" and "1". For example, a flag "0" is stored in the "Photographing Location Change Flag" column when there is not a change of a photographing location and a flag "1" is stored in the "Photographing Location Change Flag" column when there is a change of a photographing location.

The "Point" column stores a point value calculated based on a photographing situation and a photographing situation after a change of the photographing situation. The point value stored in the "Point" column is calculated by the following formula (1), for example.

Point value=(Point in case in which a photographer is changed)+(Point in case in which a subject is changed)　　　(1)

The point of the "Point in case in which a photographer is changed" in the formula (1) is calculated based on the skill levels of the current photographer and a photographer who can be changed. The information processing apparatus 11 compares the skill levels of the current photographer and a photographer who can be changed based on the values in the "Skill Level" column of the photographers obtained from the photographer information DB 216 in S82. In addition, the information processing apparatus 11 calculates the above point value based on the obtained skill levels of the current photographer and a photographer to whom the current photographer can be changed.

For example, when the skill levels of the current photographer and a photographer who can be changed are the same, the point value can be "0". In addition, when the skill level of a photographer to whom the current photographer can be changed is above the skill level of the current photographer, "+1" can be given to the point value for each difference of one skill level. Further, when the skill level of a photographer to whom the current photographer can be changed is below the skill level of the current photographer, "−1" can be given to the point value for each difference of one skill level.

For example, when the skill level of the current photographer is "C" and the skill level of a photographer to whom the current photographer can be changed is "A", the point value of the "Point in case in which a photographer is changed" is "+2". On the other hand, for example, when the skill level of the current photographer is "A" and the skill level of a photographer to whom the current photographer can be changed is "C", the point value of the "Point in case in which a photographer is changed" is "−2".

In addition, the "Point in case in which a subject is changed" can be calculated based on a point value stored in the "Subject Point" column in the subject accumulation information table 215a in the event situation DB 215.

The information processing apparatus 11 references to the subject accumulation information table 215a to obtain a value stored in the "Subject Point" column in the record included in the subject to whom the current subject can be changed. In addition, the information processing apparatus 11 calculates the difference between the point stored in the "Subject Point" column in the record in which the current subject is included and the point stored in the "Subject Point" column in the record in which the subject to whom the current subject can be changed. Further, the information processing apparatus 11 determines the difference calculated based on the values stored in the "Subject Point" column as the point value of the "Point in case in which a subject is changed". This is because the point values stored in the "Subject Point" column in the subject accumulation information table 215a increases according to the increase of the number of images.

For example, in the subject accumulation information table 215a in FIG. 4E, a value "6" is stored in the "Subject Point" column in the record in which "ID=2, 3, 4" is stored in the "Subject ID" column. When the IDs of the subjects to whom the current subject can be changed are 2, 3 and 4, a value "4" is stored in the "Subject Point" column in the record in which "ID=1, 2, 3 and 4" is stored in the "Subject ID" column in the subject accumulation information table 215a. The information processing apparatus 11 determines that the "Point in case in which a subject is changed" for the change possibility in case in which the IDs of the subjects are changed from "ID=2, 3, 4" to "ID=1, 2, 3, 4" is "2" based on the difference of the values in the "Subject Point" column.

The information processing apparatus 11 stores a point value calculated by adding the point value of the "Point in case in which a photographer is changed" and "Point in case in which a subject is changed" in the "Point" column in the change possibility list 218.

In the example of the change possibility list in FIG. 6IA, "0" is stored in the "Photographer Change Flag" column, the "Subject Change Flag" column and the "Photographing Location Change Flag" column since the photographing situation in which the image is being photographed is stored in the record in which "1" is stored in the "List ID" column. In addition, "0" is stored in the "Point" column in the record.

Further, the same information as the information stored in the photographing situation information list as illustrated in FIG. 6HA generated in S81 is stored in the "Photographer" column, the "Subject" column and the "Photographing Location" column in the record in which "1" is stored in the "List ID" column.

In the example of the change possibility list in FIG. 6IA, a record indicating a change possibility of the photographing situation in which the subject ID is "ID=13" stored in the "Proximity Terminal Information" column in the photographing situation information list in FIG. 6HA is generated. In addition, a record indicating a change possibility of the photographing situation in which the ID of the photographer stored in the "Proximity Terminal Information" column in the photographing situation information list in FIG. 6HA is "ID=13" and the subject ID is "ID=1", that is the photographer of the photographing apparatus 10 is generated.

In the example in FIG. 6IA, the record indicating the change possibility of the photographing situation in case in which the ID of the subject is "ID=13" is a record in which "2" is stored in the "List ID" column. A value "0" is stored in the "Photographer Change Flag" column in the record since the photographer is not changed in the situation. In addition, the information of the location in which the image is being photographed is stored in the "Photographing Location" column and a value "0" is stored in the "Photographing Location Change Flag" column since the photographing location is not changed. Further, the subject ID "ID=13" which is stored in the "Proximity Terminal Information" column in FIG. 6HA is stored in the "Subject" column and a value "2" is stored in the "Subject Change Flag" column. This is because the situation in which there is not a subject in the image is changed to the situation in which the subject is newly added in the image.

The "Skill Level" of the photographer with "ID=1" is "A" in the photographer information DB 216 in FIG. 4F. In addition, a value "6" is stored in the "Subject Point" column in the record in which "ID=13" is stored in the "Subject ID" column in the subject accumulation information table 215a in FIG. 4E.

Since the photographer is not changed in the record in which the ID of the subject is "ID=13" in FIG. 6IA, the information processing apparatus 11 calculates the "Point in case in which a photographer is changed" in the formula (1) to obtain "0" as the answer. In addition, since the situation in which there is not a subject in the image is changed to the situation in which the subject is newly added in the image, the information processing apparatus 11 calculates the "Point in case in which a subject is changed" in the formula (1) to obtain "6" as the answer.

Next, the record indicating the change possibility of a photographing situation in case in which the ID of the photographer is "ID=13" and the ID of the subject is "ID=1" is a record in which a value "3" is stored in the "List ID" column. Since the photographer is changed, a value "1" is stored in the "Photographer Change Flag" column. The information of the location in which the image is being photographed is stored in the "Photographing Location" column in the same record. In addition, since the photographing location is not changed, a value "0" is stored in the "Photographing Location Change Flag" column. The subject ID "ID=1" is stored in the "Subject" column and a value "2" is stored in the "Subject Change Flag" column in the same record. This is because the situation in which there is not a subject in the image is changed to the situation in which the subject is newly added in the image.

For example, "A" is stored in the "Skill Level" column for the photographer with ID=1 and "C" is stored in the "Skill Level" column for the photographer with ID=13 in the photographer information DB 216 in FIG. 4F. In addition, a value "2" is stored in the "Subject Point" column in the record in which "ID=1" is stored in the "Subject ID" column in the subject accumulation information table 215*a* in FIG. 4E.

The information processing apparatus 11 calculates the "Point in case in which a photographer is changed" in the formula (1) to obtain "−2" as the answer. In addition, since the situation in which there is not a subject in the image is changed to the situation in which the subject is newly added in the image, the information processing apparatus 11 calculates the "Point in case in which a subject is changed" in the formula (1) to obtain "2" as the answer. Further, the information processing apparatus 11 determines that the ID of the photographer is "ID=13" based on the formula (1) and stores a value "0" in the "Point" column in the record in which the ID of the subject is "ID=1".

Moreover, in the example of the change possibility list 218 in FIG. 6IB, a record indicating a change possibility of the photographing situation in which the subject ID is "ID=1" stored in the "Proximity Terminal Information" column in the photographing situation information list in FIG. 6HB is generated. In addition, a record indicating a change possibility of the photographing situation in which the ID of the photographer stored in the "Proximity Terminal Information" column in the photographing situation information list in FIG. 6HB is "ID=13" and the subject ID is "ID=1", that is the photographer of the photographing apparatus 10 is generated.

In the example in FIG. 6IB, the record indicating the change possibility of a photographing situation in case in which the ID of the subject is "ID=1" is a record in which a value "2" is stored in the "List ID" column. Since the photographer is not changed, a value "0" is stored in the "Photographer Change Flag" column. The information of the location in which the image is being photographed is stored in the "Photographing Location" column in the same record. In addition, since the photographing location is not changed, a value "0" is stored in the "Photographing Location Change Flag" column. The subject ID "ID=1" is stored in the "Subject" column and a value "2" is stored in the "Subject Change Flag" column in the same record. This is because the situation in which there is not a subject in the image is changed to the situation in which the subject is newly added in the image.

For example, "C" is stored in the "Skill Level" column for the photographer with ID=13 in the photographer information DB 216 in FIG. 4F. In addition, a value "2" is stored in the "Subject Point" column in the record in which "ID=1" is stored in the "Subject ID" column in the subject accumulation information table 215*a* in FIG. 4E.

Since the photographer is not changed in the record in which the ID of the subject is "ID=1" in FIG. 6IB, the information processing apparatus 11 calculates the "Point in case in which a photographer is changed" in the formula (1) to obtain "0" as the answer. Further, since the situation in which there is not a subject in the image is changed to the situation in which the subject is newly added in the image, the information processing apparatus 11 calculates the "Point in case in which a subject is changed" in the formula (1) to obtain "2" as the answer. In addition the information processing apparatus 11 stores a value "2" in the "Point" column in the record in which the ID of the subject is "ID=1".

Next, the record indicating the change possibility of a photographing situation in case in which the ID of the photographer is "ID=1" and the ID of the subject is "ID=13" is a record in which a value "3" is stored in the "List ID" column. Since the photographer is changed, a value "1" is stored in the "Photographer Change Flag" column. The information of the location in which the image is being photographed is stored in the "Photographing Location" column in the same record. In addition, since the photographing location is not changed, a value "0" is stored in the "Photographing Location Change Flag" column. The subject ID "ID=13" is stored in the "Subject" column and a value "2" is stored in the "Subject Change Flag" column in the same record. This is because the situation in which there is not a subject in the image is changed to the situation in which the subject is newly added in the image.

For example, "C" is stored in the "Skill Level" column for the photographer with ID=13 and "A" is stored in the "Skill Level" column for the photographer with ID=1 in the photographer information DB 216 in FIG. 4F. In addition, a value "6" is stored in the "Subject Point" column in the record in which "ID=13" is stored in the "Subject ID" column in the subject accumulation information table 215*a* in FIG. 4E.

The information processing apparatus 11 calculates the "Point in case in which a photographer is changed" in the formula (1) to obtain "2" as the answer. In addition, since the situation in which there is not a subject in the image is changed to the situation in which the subject is newly added in the image, the information processing apparatus 11 calculates the "Point in case in which a subject is changed" in the formula (1) to obtain "6" as the answer. Further, the information processing apparatus 11 determines that the ID of the photographer is "ID=1" based on the formula (1) and stores a value "8" in the "Point" column in the record in which the ID of the subject is "ID=13".

The information processing apparatus 11 generates in S84 in the flowchart in FIG. 6G a change possibility list 218 for each photographing apparatus 10 indicating the change possibilities of the photographer, the subject and the photographing location by using the point values as described above. The generated change possibility list 218 is temporarily stored in a predetermined area in the auxiliary memory 93. In addition, the information processing apparatus 11 transmits a notification of the completion of the generation of the change possibility information according to the photographing situation to the photographing apparatus 10 which is photographing the image when the generated change possibility list 218 is stored in the auxiliary memory 93, for example. The information processing apparatus 11 transmits a notification of the completion of the generation of the change possibility information regarding the photographer with ID=1 to the photographing apparatus 10 of the photographer with ID=1. Similarly, the information processing apparatus 11 transmits a notification of the completion of the generation of the change possibility information regarding the photographer with ID=13 to the photographing apparatus 10 of the photographer with ID=13.

(Photographing Advice Notification Processes)

Figure 6J:
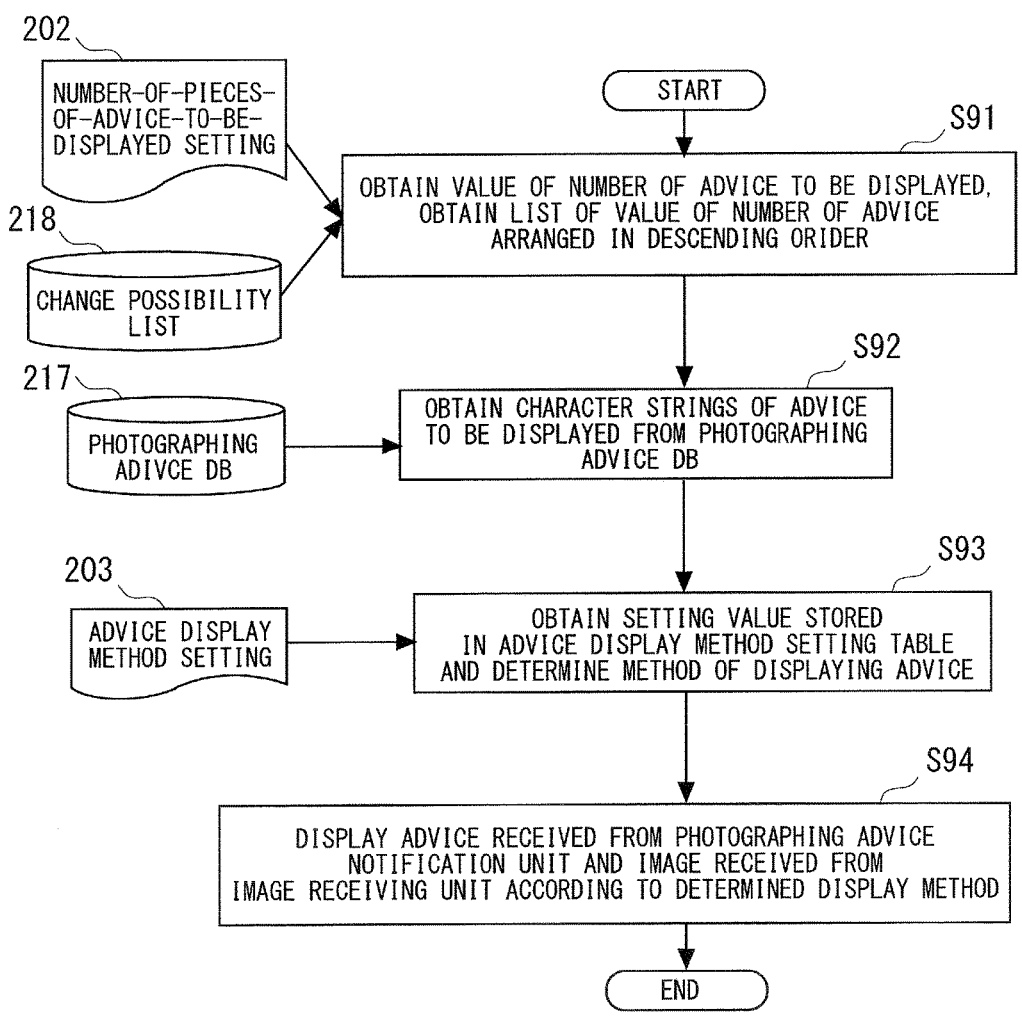
FIG. 6J is a diagram illustrating an example of a flowchart of a photographing advice notification process in S26 in FIG. 6A.

Next, the photographing advice notification processes in S26 in FIG. 6A are described with reference to the flowchart in FIG. 6J. The photographing advice notification processes in FIG. 6J are performed by the photographing apparatus 10 in the photographing assisting system 1. In the photographing advice notification processes in FIG. 6J, the photographing apparatus 10 determines photographing advice information related to the photographing situation based on the notification of the completion of the generation of the change possibility list 218 generated in S25 in FIG. 6A. The photographing apparatus 10 displays the determined photographing advice information with overlapping the image on the monitor such as the EL panel. The photographing advice notification processes in FIG. 6J are performed for each photographing apparatus 10 which is photographing the image.

In S91 in the flowchart in FIG. 6J, the photographing apparatus 10 obtains the value set for the number of pieces of advice to be displayed on the EL panel etc. when the photographing apparatus 10 receives the notification of the completion from the information processing apparatus 11. The photographing apparatus 10 references to the change possibility list 218 stored in the auxiliary memory 93 in the information processing apparatus 11 to obtain the record of the value set for the number of pieces of advice as advice to be displayed from the number-of-pieces-of-advice-to-be-displayed setting table 202. The photographing apparatus 10 obtains the record of the value set for the number of pieces of advice from the number-of-pieces-of-advice-to-be-displayed setting table 202 in descending order of point values stored in the "Point" column of the change possibility list 218. The photographing apparatus 10 stores the records in the obtained change possibility list 218 in a predetermined area in the main memory 92.

FIG. 6K illustrates an example of the number-of-pieces-of-advice-to-be-displayed setting table 202. The number-of-pieces-of-advice-to-be-displayed setting table 202 includes a "Setting Item" column which stores the number of pieces of advice to be displayed and the setting items, a "Preset Value" column and a "Current Value" column for storing a value representing the number of pieces of advice to be displayed. The "Preset Value" column in the number-of-pieces-of-advice-to-be-displayed setting table 202 stores values preset in each photographing apparatus 10. The "Current Value" stores values set by the photographer of the photographing apparatus 10. The "Current Value" column stores a value set by the photographer of the photographing apparatus 10, for example. In the example in FIG. 6K, "1" is stored in the "Preset Value" column and "1" is stored in the "Current Value". For example, a value "1" is set for the number of pieces of advice to be displayed for the photographing apparatuses owned by the administrator of which the photographer ID is 1 and owned by the female friend C of which the photographer ID is 13 as illustrated in FIG. 6K.

The photographing apparatus 10 references in S91 in FIG. 6J to the number-of-pieces-of-advice-to-be-displayed setting table 202 in FIG. 6K and obtains a value "1" stored in the "Current Value" in the record which stores the number of pieces of advice to be displayed and the setting items.

Each photographing apparatus 10 references to the point value stored in the "Point" column in the change possibility list 218 as illustrated in FIGS. 6IA and 6IB. And each photographing apparatus 10 obtains the records in descending order the number of which corresponds to the number of pieces of advice to be displayed.

(Processes in S92 Performed by Photographing Apparatus 10 of Photographer with Photographer ID=1)

In the example in FIG. 6IA, the point in case in which the ID of the subject is 13 is "6". And the point in case in which the ID of the photographer is 13 and the ID of the subject is 1 is "0". The photographing apparatus 10 obtains records in which "6" is stored in the "Point" column as advice to be displayed from the change possibility list 218 and temporarily stores the obtained records in a predetermined area in the main memory 92.

FIG. 6LA illustrates a record as advice to be displayed which are obtained by the photographing apparatus 10 in S91 in FIG. 6J. As illustrated in FIG. 6LA, the photographing apparatus 10 obtains the record in the change possibility list 218 in which the highest point value is stored in a predetermined area in the main memory 92.

The record in FIG. 6LA indicates that there can be a change of the photographing situation in which the subject with ID=13 is newly added in the image. The user with the subject ID=13 is a user corresponding to the value "ID=13" stored in the "Proximity Terminal Information" column in the photographing situation information list in FIG. 6HA, that is the user is the female friend C. The photographing apparatus 10 uses the record obtained from the change possibility list 218 as illustrated in FIG. 6LA and displays the advice of the change possibility of the photographing situation.

In S92 in the flowchart in FIG. 6J, the photographing apparatus 10 references to the photographing advice DB 217 and obtains character strings of the advice according to the record of the advice obtained in S91.

FIG. 6M illustrates an example of the photographing advice DB 217. The photographing advice DB 217 includes an "Advice ID" column, a "Change Details" column and an "Advice Character Strings" column, for example. The "Advice ID" column stores identification information (advice ID) for uniquely identifying each piece of advice. The "Change Details" column stores attribute information of a target which is changed when a photographing situation is changed. The attribute information includes a photographer, a subject and a photographing location etc. The attribute information including a photographer, a subject and a photographing location corresponds to the information for which a value "1" or "2" is stored in the "Photographer Change Flag" column, the "Subject Change Flag" column and the "Photographing Location Change Flag" column, respectively.

For example, the attribute information corresponding to "Subject (1)" is information in case in which a value "1" is stored in the "Subject Change Flag" column and the attribute information corresponding to "Subject (2)" is information in case in which a value "2" is stored in the "Subject Change Flag" column. In addition, the attribute information corresponding to "Photographer and Subject (1)" is information in case in which a value "1" is stored in the "Photographer Change Flag" column and the "Subject Change Flag" column. Similarly, the attribute information corresponding to "Photographer and Subject (2)" is information in case in which a value "1" is stored in the "Photographer Change Flag" column and a value "2" is stored in the "Subject Change Flag" column.

The "Advice Character Strings" column stores character string information of the advice to be displayed. The character string information of the advice includes an insert area into which the attribute information is inserted as character strings. For example, the insert area of the character strings can be provided between brackets such as "< >".

In the example in FIG. 6M, the "Change Details" column of the record in which a value "1" is stored in the "Advice ID" column stores "Photographer" which is attribute information of a target to be changed in the current photographing situation. In addition, the "Advice Character Strings" column in the same record stores an advice message for suggesting for changing a photographing situation to change a photographer stating "<Photographer ID> is around. Why don't you ask him/her to photograph an image?".

In addition, the "Change Details" column in the record in which a value "11" is stored in the "Advice ID" column stores "Subject (2)" which is attribute information of a target to be changed in the current photographing situation. Further, the "Advice Character Strings" column in the same record stores an advice message for suggesting for changing a photographing situation to add a subject in the image stating "<Subject ID> is around. Why don't you offer to photograph him/her?".

Moreover, the "Change Details" column in the record in which a value "101" is stored in the "Advice ID" column stores "Photographer and Subject (2)" which is attribute information of a target to be changed in the current photographing situation. Further, the "Advice Character Strings" column in the same record stores an advice message for suggesting for changing a photographing situation to change a photographer and add a subject in the image stating "<Subject ID> is around. Why don't you ask him/her to photograph you?".

The "Photographer ID" in the character strings in the insert area of the advice represents the identification information (photographer ID) of the "Photographer" stored in the "Change Details" column. When the photographing apparatus 10 obtains the advice character strings, the photographing apparatus 10 replaces the character strings "Photographer ID" in the insert area with the text information of the photographer indicated by the photographer ID stored in the "Photographer" column in the record in FIG. 6LA. The photographing apparatus 10 references to the photographer information DB 216 in FIG. 4F, obtains the photographer name stored in the "Photographer Name" column in the record corresponding to the photographer ID and replace the character strings "Photographer ID" in the insert area with the obtained photographer name.

Similarly, "Subject ID" in the character strings in the insert area of the advice represents the identification information (subject ID) of the "Subject" stored in the "Change Details" column. When the photographing apparatus 10 obtains the advice character strings, the photographing apparatus 10 replaces the character strings "Subject ID" in the insert area with the text information of the subject indicated by the subject ID stored in the "Subject" column in the record in FIG. 6LA. The photographing apparatus 10 references to the subject DB 212 in FIG. 4B, obtains the subject name stored in the "Subject Name" column in the record corresponding to the subject ID and replace the character strings "Subject ID" in the insert area with the obtained subject name.

In S92 in FIG. 6J, the photographing apparatus 10 references to the values stored in the "Photographer Change Flag" column, the "Subject Change Flag" column and the "Photographing Location Change Flag" column in the record in the change possibility list 218 obtained in S91 and determines the attribute information of the target to be changed. For example, in the record in FIG. 6LA, the attribute information of the target to be changed for which a value "2" is stored in the "Photographer Change Flag" column, the "Subject Change Flag" column and the "Photographing Location Change Flag" column is "Subject". Therefore, the photographing apparatus 10 references to the photographing advice DB 217 to determine the record in which "Subject (2)" is stored in the "Change Details" column and obtains advice character strings stored in the "Advice Character Strings" column in the determined record. As a result, the obtained character strings are "<Subject ID> is around. Why don't you offer to photograph him/her?" which are stored in the record in which a value "11" is stored in the "Advice ID" column.

In addition, the photographing apparatus 10 references to the subject DB 212 and determines the subject name stored in the "Subject Name" column in the record in which the subject ID is stored in the "Subject" column among the records in the change possibility list 218 obtained in S91. The photographing apparatus 10 determines that the subject with the subject ID=13 stored in the "Subject" column in the record in FIG. 6LA is the female friend C. And the photographing apparatus 10 replace the character strings in the insert area in the advice with the determined subject to generate the advice character strings. The advice character strings corresponding to the record in FIG. 6LA are generated as follows, for example.

List ID=2: "Female friend C is around. Why don't you photograph her?"

The photographing apparatus 10 of the photographer with ID=1 temporarily stores the advice character strings generated in S92 in FIG. 6J in a predetermined area in the main memory 92.

(Processes in S92 Performed by Photographing Apparatus 10 of Photographer with ID=13)

In the example in FIG. 6IB, the point value is "2" when the ID of the subject is "1" and the point value is "8" when the ID of the photographer is "1" and the ID of the subject is "13". The photographing apparatus 10 obtains from the change possibility list 218 the records as advice to be displayed in which a value "8" is stored in the "Point" column and temporarily stores the obtained records in a predetermined area in the main memory 92. As illustrated in FIG. 6LB, the photographing apparatus 10 obtains the record in the change possibility list 218 in which the highest point value is stored in a predetermined area in the main memory 92.

The record in FIG. 6LB suggests that the photographing situation can be changed to a situation in which the ID of the photographer is "1" and the ID of the subject is 13. The user with the subject ID=13 is the photographer of the image, that is the female friend C and the user with the photographer ID=1 is the user of which the ID stored in the "Proximity Terminal Information" column in the photographing situation information list in FIG. 6HB is "1". The photographing apparatus 10 displays the advice of the change possibility of the photographing situation according to the record obtained from the change possibility list 218 as illustrated in FIG. 6LB.

The photographing apparatus 10 references to the photographing advice DB 217 in S92 in FIG. 6J and obtains character strings of advice corresponding to the advice obtained in S91.

The photographing apparatus 10 references to the values stored in the "Photographer Change Flag" column, the "Subject Change Flag" column and the "Photographing Location Change Flag" column in the records in the change possibility list 218 obtained in S91 and determines the attribute information of the target to be changed. For example, the attribute information of the target to be changed for which a value "1" is stored in the "Photographer Change Flag" column and a value "2" is stored in the "Subject Change Flag" column in the record in FIG. 6LB is "Photographer and Subject (2)".

The photographing apparatus 10 references to the photographing advice DB 217 to determine the records in which "Photographer and Subject (2)" is stored in the "Change Details" column and obtains the advice character strings stored in the "Advice Character Strings" column in the determined records. As a result, the obtained advice character strings are "<Photographer ID> is around. Why don't you ask him/her to photograph you?".

The photographing apparatus 10 references to the photographer information DB 216 and determines the photographer name stored in the "Photographer Name" column in the record in which the photographer ID is stored in the "Photographer" column among the records in the change possibility list 218 obtained in S91. The photographing apparatus 10 determines that the subject with the photographer ID=1 stored in the "Photographer" column in the record in FIG. 6LB is the administrator. And the photographing apparatus 10 replace the character strings in the insert area in the advice with the determined subject to generate the advice character strings. The advice character strings corresponding to the record in FIG. 6LB are generated as follows, for example.

List ID=3: "Administrator is around. Why don't you ask him to photograph you?"

The photographing apparatus 10 of the photographer with ID=13 temporarily stores the advice character strings generated in S92 in FIG. 6J in a predetermined area in the main memory 92.

Referring back to the flowchart in FIG. 6J, the photographing apparatus 10 references to the advice display method setting table 203 stored in the auxiliary memory 93 in S93 and determines a method of displaying the advice. The photographing apparatus 10 displays the advice character strings generated in S92 according to the method of displaying the advice determined in S93 (S94). The photographing apparatus 10 displays the advice character strings generated in S92 information with overlapping the image on the monitor such as the EL panel.

The processes S91 and S92 performed by the photographing apparatus 10 are an example of a step for obtaining from the information processing apparatus photographing advice for a photographing situation indicating a subject in the image, a photographer of the photographing apparatus and a group including at least one photographing apparatus within a predetermined area of a location in which the image is photographed. In addition, the CPU 91 etc. of the photographing apparatus 10 performs the processes S91 and S92 as an example of means for obtaining from the information processing apparatus photographing advice for a photographing situation indicating a subject in the image, a photographer of the photographing apparatus and a group including at least one photographing apparatus within a predetermined area of a location in which the image is photographed.

In addition, the processes S93 and S94 performed by the photographing apparatus 10 are an example of a step for outputting the obtained photographing advice to an information outputting unit of the photographing apparatus. In addition, the CPU 91 etc. of the photographing apparatus 10 performs the processes S93 and S94 as an example of means for outputting the obtained photographing advice to an information outputting unit of the photographing apparatus.

FIG. 6N illustrates an example of the advice display method setting table 203. The advice display method setting table 203 in FIG. 6N stores methods of displaying advice on the monitor and effects applied to the displaying of the advice along with setting values.

The advice display method setting table 203 in FIG. 6N includes a "Setting Value" column, a "File Name" column and a "Descriptions of Display Method". The "Setting Value" column stores values representing the display methods. The "File Name" column stores the names of files in which formats of displaying the advice character strings are defined. For example, the files in which formats of displaying the advice character strings are defined are Extensible Markup Language (XML) files. The files in which formats of displaying the advice character strings are defined include the text information such as font information, the displaying position on the EL panel etc., the displaying timing, the sound effects for the displaying, the types of the sound etc. The photographing apparatus 10 displays the advice character strings according to the information defined in the file specified in the "File Name" column. The "Descriptions of Display Method" column stores the descriptions of the display method defined by the file specified in the "File Name" column.

In the example in FIG. 6N, the record in which a value "1" is stored in the "Setting Value" column is defined as a predetermined value for the photographing apparatus 10. The predetermined value indicates a method of displaying the advice character strings for a plurality of change possibilities concurrently in the display area on the EL panel etc. without sound effects, for example. The predetermined value is defined with the prospect that the users frequently use the display method defined by the predetermined value.

In the example in FIG. 6N, the method of displaying the records in which a value "3" is stored in the "Setting Value" column indicates a method of displaying the advice character strings for a plurality of change possibilities one by one in the display area on the EL panel etc. with sound effects, for example.

The photographing apparatus 10 references to the file "Advice1.xml" stored in the "File Name" column in the record in which a value "1" is stored in the "Setting Value" column and determines the method of displaying the advice character strings, for example. The photographing apparatus 10 of the photographer with ID=1 or 13 references to the file "Advice1.xml" in the record in which a value "1" is stored in the "Setting Value" column and determines the method of displaying the advice character strings. And each photographing apparatus 10 displays the advice character strings for the plurality of change possibilities generated in S92 in FIG. 6J and displays the character strings without sound effects.

Figure 7A:
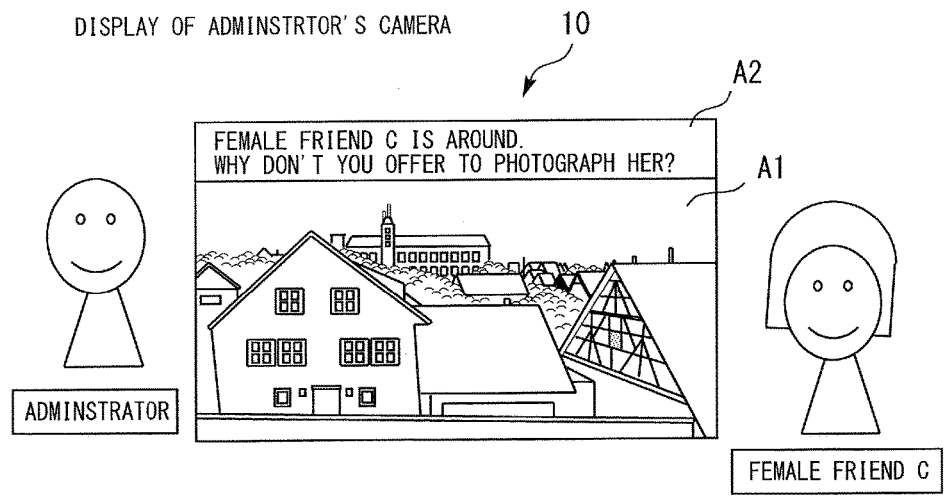
FIGS. 7A and 7B are diagrams illustrating methods of displaying advice strings in photographing apparatuses.
Figure 7B:
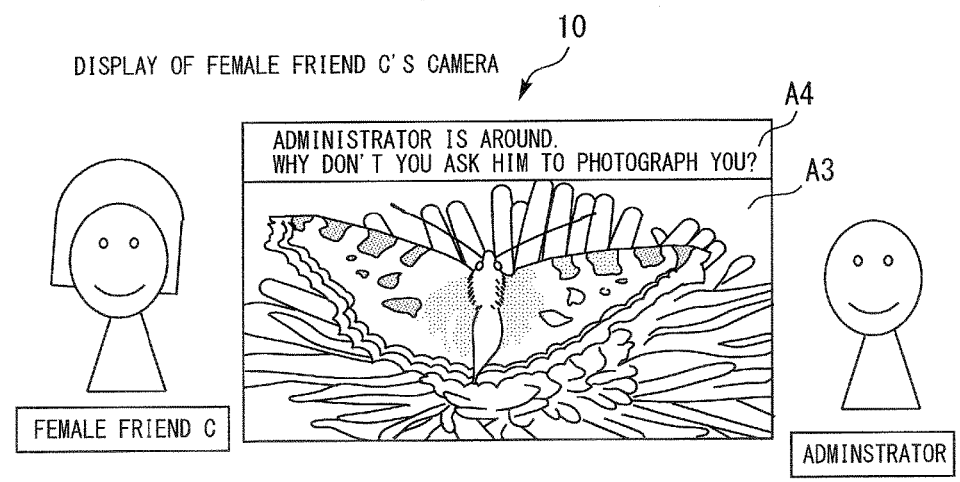

FIGS. 7A and 7B illustrate examples of methods of displaying advice character strings by the photographing apparatus. FIG. 7A illustrates an example of displaying the character strings in the photographing apparatus 10 of the photographer with ID=1. FIG. 7B illustrates an example of displaying the character strings in the photographing apparatus 10 of the photographer with ID=13. FIG. 7A illustrates a photographing situation in which the photographer with ID=1, that is the administrator photographs landscape such as a town. FIG. 7B illustrates a photographing situation in which the photographer with ID=13, that is the female friend C photographs landscape such as a butterfly. The photographing apparatuses 10 are close to each other.

The methods of displaying the advice character strings in FIGS. 7A and 7B are the display methods determined in S93. The photographing apparatus 10 displays the advice character strings on the monitor such as the EL panel with overlapping the displayed image.

In the example in FIG. 7A, the area A1 is the display area of the monitor. The area A1 includes landscape such as a town. The area A2 is the area for displaying the advice character strings and overlaps the area A1. The area A2 is provided in the upper area in the display area of the monitor, for example. When the display method corresponding to the setting value "1" in FIG. 6N is applied, the advice character strings corresponding to the list ID=2 in FIG. 6LA stating "Female Friend C is around. Why don't you offer to photograph her?" is displayed. Therefore, the advice character strings stating "Female Friend C is around. Why don't you offer to photograph her?" is displayed in the area A2 with overlapping the displayed image in the photographing apparatus 10 of the administrator.

In FIG. 7B, the area A3 is a display area of the monitor and an image of landscape such as a butterfly is displayed in the area A3. The area A4 is a display area for displaying the advice character strings and overlaps the area A3. The area A4 is provided in the upper area of the display area of the monitor. When the display method corresponding to the setting value "1" in FIG. 6N is applied, the advice character strings corresponding to the list ID=3 in FIG. 6LB stating "Administrator is around. Why don't you ask him to photograph you?" is displayed. Therefore, the advice character strings stating "Administrator is around. Why don't you ask him to photograph you?" is displayed in the area A4 with overlapping the displayed image in the photographing apparatus 10 of the female friend C.

As illustrated in FIGS. 7A and 7B, the photographing apparatuses 10 which are close to each other display the advice character strings according to the photographing situation with overlapping the displayed image. The photographers of the photographing apparatuses 10 can communicate with each other and encourage their mutual communication when the advice message is displayed on the monitors.

When the advice message is displayed on the monitor of each photographing apparatus 10, the photographers can modify the images according to the displayed message. In addition, when the modified images are stored as image records, the photographers can share the image records. For example, when the photographing apparatus 10 of the administrator stores the image as an image record, the administrator can transmit the recorded image as image data to the female friend C. In the photographing assisting system 1, an advice message for suggesting the sharing of the images photographed after the change of the image.

For example, the information processing apparatus 11 detects the female friend C included in the image after the change of the image in the subject recognition processes within a certain period after the completion of the generation of the change possibility list 218. And the information processing apparatus 11 transmits advice character strings for suggesting sharing of the image stating "Why don't you share this image with female friend C?" to the photographing apparatus 10 of the administrator, for example. The photographing apparatus 10 of the administrator can display the advice character strings when the shutter button of the photographing apparatus 10 is pressed for confirming the recording of the image, for example.

The advice information for suggesting the sharing of the image can be included in the advice character strings stored in the photographing advice DB 217 in FIG. 6M. When the photographing apparatus 10 obtains the advice information for the change of the photographing situation and the advice information for the sharing of the image, for example, the photographing apparatus 10 can display the advice information for the sharing of the image on the monitor within a certain time period after the photographing apparatus 10 displays the advice information for the change of the photographing situation.

As described above, the photographing assisting system 1 according to the present embodiment recognizes subjects and photographers based on images which are being photographed. In addition, the photographing assisting system 1 determines photographing locations of the photographing apparatuses 10 and further determines photographers of other photographing apparatuses close to the photographing apparatuses 10.

The photographing assisting system 1 also determines photographing situations of the photographing apparatus 10 based on the subject(s), the photographer(s), the photographing location(s) and the locations of the other photographing apparatuses 10. In addition, the photographing assisting system 1 calculates the frequencies of photographing subjects as subject frequencies in events and calculates subject points reflecting skill levels of the photographers on the subject frequencies.

Further, the photographing assisting system 1 generates change possibility information in which the possibilities of the changes of subjects, photographers and photographing locations etc. according to the changes of photographing situations are graded with points. The photographing assisting system 1 recognizes situations in which photographed images do not include a subject and the generated change possibility information includes the changes of the subjects in the photographing situations. Therefore, the photographing assisting system 1 generates change possibility information for a photographing situation in which a subject is not included in an image such as landscape.

Since points calculated based on the subject points before and after the changes of the photographing situations are reflected on the points indicated by the change possibility information, the photographing assisting system 1 can suggest for increasing images of subjects when the number of images of the subjects are smaller than the number of images of other subjects. In addition, since points calculated based on the photographers before and after the changes can be reflected on the points in the change possibility information, the photographing assisting system 1 can suggest photographers the skill levels of which are higher than the other photographers.

Moreover, the photographing assisting system 1 selects photographing advice for the photographing situations according to the differences of the points in the change possibility information. In the photographing assisting system 1, the photographing advice can be provided for a situation in which a subject is not included in an image which is being photographed. The selected photographing advice can be displayed for each photographing apparatus 10 according to each photographing situation. As a result, the photographing apparatuses 10 in the photographing assisting system 1 can encourage communications among the users to enhance mutual exchanges among the photographers. In addition, when such mutual exchanges are enhanced, opportunities of photographing images and videos for the participants can be increased to adjust the unevenness of the opportunities.

<<Computer Readable Recording Medium>>

It is possible to record a program which causes a computer to implement any of the functions described above on a computer readable recording medium. In addition, by causing the computer to read in the program from the recording medium and execute it, the function thereof can be provided.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory). In addition, a Solid State Drive (SSD) can be used either as a recording medium which is detachable from the computer or as a recording medium which is fixed to the computer.

According to one aspect, a technique for encouraging mutual communications between photographers and the unevenness of the opportunities for photographing images can be adjusted.

All example and situational language recited herein are intended for pedagogical purposes to aid the reader in understanding the invention and the concepts contributed by the inventor to furthering the art, and are to be construed as being without limitation to such specifically recited examples and situations, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A photographing assisting system, comprising:
   a plurality of photographing apparatuses; and
   an information processing apparatus which receives images from the plurality of photographing apparatuses, recognizes a subject in each received image and a location in which each received image is photographed, determines a group including at least one photographing apparatus within a predetermined area of each photographing apparatus and detects a photographing situation indicating the subject, the location and a photographer of the photographing apparatus within the predetermined area,
   wherein the information processing apparatus calculates a point based on a frequency of appearance of the subject in the received images;
   the information processing apparatus generates, based on the calculated point, information of possibility that the photographer or the subject in the group may be changed,
   the information processing apparatus determines, based on the generated information, photographing advice for suggesting the photographer of the photographing apparatus in the group that the photographer or the subject in the group be changed,
   the information processing apparatus outputs the photographing advice to the photographing apparatus in the group, and
   the photographing apparatus in the group outputs the photographing advice received from the information processing apparatus.

2. The photographing assisting system according to claim 1, wherein the information processing apparatus determines the photographing situation of a first photographing apparatus in the group and outputs photographing advice for photographing a photographer of the first photographing apparatus as a subject to a second photographing apparatus in the group.

3. The photographing assisting system according to claim 1, wherein the information processing apparatus determines the photographing situation of a first photographing apparatus in the group and outputs photographing advice for asking a photographer of a second photographing apparatus in the group to photograph a photographer of the first photographing apparatus as a subject to the first photographing apparatus.

4. A photographing apparatus, comprising:
   a processor; and
   memory storing instructions for causing the processor to execute:
   outputting an image to an information processing apparatus;
   obtaining from the information processing apparatus photographing advice for suggesting a photographer of the photographing apparatus in a group that the photographer or a subject in the group be changed, the group including at least one photographing apparatus within a predetermined area of a location in which the image is photographed, the photographing advice being determined by the information processing apparatus based on information of possibility that the photographer or the subject in the group may be changed, the information of possibility being generated by the information processing apparatus based on a point, and the point being calculated by the information processing apparatus based on a frequency of appearance of the subject in images received by the information processing apparatus;
   outputting the photographing advice to an information outputting unit of the photographing apparatus.

5. An information processing apparatus, comprising:
   a processor; and
   memory storing instructions for causing the processor to execute:
   obtaining a location of each of a plurality of photographing apparatuses connected with the information processing apparatus;
   receiving images from the plurality of photographing apparatuses;
   recognizing a subject in each image and a location in which each image is photographed;
   determining a group including at least one photographing apparatus within a predetermined area of each photographing apparatus;
   detecting a photographing situation indicating the subject, the location and a photographer of the photographing apparatus within the predetermined area;
   calculating a point based on a frequency of appearance of the subject in the received images;
   generating, based on the calculated point, information of possibility that the photographer or the subject in the group may be changed;
   determining, based on the generated information, photographing advice for suggesting the photographer of the photographing apparatus in the group that the photographer or the subject in the group be changed; and
   outputting the photographing advice to the photographing apparatus in the group.

6. A non-transitory computer-readable recording medium storing a program that causes a computer in an information processing apparatus in a photographing assisting system to execute a first process and a program that causes computers in a plurality of photographing apparatuses to execute a second process in the photographing assisting system, the first process comprising:
   receiving images from the plurality of photographing apparatuses;
   recognizing a subject in each received image and a location in which each received image is photographed;

determining a group including at least one photographing apparatus within a predetermined area of each photographing apparatus;

detecting a photographing situation indicating the subject, the location and a photographer of the photographing apparatus within the predetermined area;

calculating a point based on a frequency of appearance of the subject in the received images;

generating, based on the calculated point, information of possibility that the photographer or the subject in the group may be changed;

determining, based on the generated information, photographing advice for suggesting the photographer of the photographing apparatus in the group that the photographer or the subject in the group be changed;

outputting the photographing advice to the photographing apparatus in the group, and the second process comprising:

obtaining from the information processing apparatus the photographing advice; and outputting the obtained photographing advice to an information outputting unit of the photographing apparatus.

7. An photographing assisting method, comprising:

receiving, by a first computer in an information processing apparatus in a photographing assisting system, images from the plurality of photographing apparatuses;

recognizing, by the first computer, a subject in each received image and a location in which each received image is photographed;

determining, by the first computer, a group including at least one photographing apparatus within a predetermined area of each photographing apparatus;

detecting, by the first computer, a photographing situation indicating the subject, the location and a photographer of the photographing apparatus within the predetermined area;

calculating, by the first computer, a point based on a frequency of appearance of the subject in the received images;

generating, by the first computer, based on the calculated point, information of possibility that the photographer or the subject in the group may be changed;

determining, by the first computer, based on the generated information, photographing advice for suggesting the photographer of the photographing apparatus in the group that the photographer or the subject in the group be changed;

outputting, by the first computer, the photographing advice to the photographing apparatus in the group;

obtaining, by second computers in a plurality of photographing apparatuses in a photographing assisting system, from the information processing apparatus the photographing advice; and outputting, by the second computers, the obtained photographing advice to an information outputting unit of the photographing apparatus.

* * * * *